US008521923B2

(12) United States Patent
Lee et al.

(10) Patent No.: US 8,521,923 B2
(45) Date of Patent: *Aug. 27, 2013

(54) STORAGE-SIDE STORAGE REQUEST MANAGEMENT

(75) Inventors: Sue K. Lee, Foster City, CA (US); Vivekananda C. Kolla, Cupertino, CA (US); Akshay D. Shah, Sunnyvale, CA (US); Sumanta Chatterjee, Fremont, CA (US); Margaret Susairaj, Sunnyvale, CA (US); Juan R. Loaiza, Woodside, CA (US); Alexander Tsukerman, Foster City, CA (US); Sridhar Subramaniam, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/418,150

(22) Filed: Mar. 12, 2012

(65) Prior Publication Data

US 2012/0173774 A1 Jul. 5, 2012

Related U.S. Application Data

(63) Continuation of application No. 12/563,073, filed on Sep. 18, 2009, now Pat. No. 8,145,806.

(60) Provisional application No. 61/192,668, filed on Sep. 19, 2008, provisional application No. 61/099,872, filed on Sep. 24, 2008.

(51) Int. Cl.
*G06F 3/00* (2006.01)

(52) U.S. Cl.
USPC ........ 710/39; 710/5; 710/36; 710/40; 710/42; 710/74; 718/102; 718/103; 718/104

(58) Field of Classification Search
None
See application file for complete search history.

(56) References Cited

U.S. PATENT DOCUMENTS

| 4,425,615 A | 1/1984 | Swenson et al. |
| 5,487,164 A | 1/1996 | Kirchhofer et al. |

(Continued)

FOREIGN PATENT DOCUMENTS

| CN | 101150483 A | 3/2008 |
| JP | 2002-278704 A | 9/2002 |

(Continued)

OTHER PUBLICATIONS

U.S. Appl. No. 11/716,364, filed Mar. 8, 2007, Office Action, May 7, 2012.

(Continued)

*Primary Examiner* — Idriss N Alrobaye
*Assistant Examiner* — Dayton Lewis-Taylor
(74) *Attorney, Agent, or Firm* — Hickman Palermo Truong Becker Bingham Wong LLP; Karl T. Rees

(57) ABSTRACT

Techniques are provided for managing, within a storage system, the sequence in which I/O requests are processed by the storage system based, at least in part, on one or more logical characteristics of the I/O requests. The logical characteristics may include, for example, the identity of the user for whom the I/O request was submitted, the service that submitted the I/O request, the database targeted by the I/O request, an indication of a consumer group to which the I/O request maps, the reason why the I/O request was issued, a priority category of the I/O request, etc. Techniques are also provided for automatically establishing a scheduling policy within a storage system, and for dynamically changing the scheduling policy in response to changes in workload.

50 Claims, 6 Drawing Sheets

(56) References Cited

U.S. PATENT DOCUMENTS

| | | |
|---|---|---|
| 5,551,018 A | 8/1996 | Hansen |
| 5,765,034 A | 6/1998 | Recio |
| 6,044,367 A | 3/2000 | Wolff |
| 6,715,006 B1 | 3/2004 | Hotta et al. |
| 6,728,823 B1 | 4/2004 | Walker et al. |
| 6,886,084 B2 | 4/2005 | Kawashima et al. |
| 6,922,754 B2 | 7/2005 | Liu et al. |
| 6,928,451 B2 | 8/2005 | Mogi et al. |
| 7,069,324 B1 | 6/2006 | Tiwana et al. |
| 7,093,162 B2 | 8/2006 | Barga et al. |
| 7,136,970 B2 | 11/2006 | Yoshiya et al. |
| 7,159,076 B2 | 1/2007 | Madter |
| 7,165,144 B2 | 1/2007 | Choubal et al. |
| 7,228,354 B2 | 6/2007 | Chambliss et al. |
| 7,237,027 B1 | 6/2007 | Raccah et al. |
| 7,290,090 B2 | 10/2007 | Madter |
| 7,370,068 B1 | 5/2008 | Pham et al. |
| 7,420,987 B1 | 9/2008 | Basu et al. |
| 7,454,420 B2 | 11/2008 | Ray et al. |
| 7,461,147 B1 | 12/2008 | Mowat et al. |
| 7,506,103 B2 | 3/2009 | Madter |
| 7,689,623 B1 | 3/2010 | Liu |
| 7,761,425 B1 | 7/2010 | Erickson et al. |
| 7,895,216 B2 | 2/2011 | Longshaw et al. |
| 7,904,562 B2 | 3/2011 | Takase et al. |
| 8,001,134 B2 | 8/2011 | Liu |
| 8,244,984 B1 | 8/2012 | Glasco et al. |
| 8,370,452 B2 | 2/2013 | Harvell et al. |
| 2002/0143755 A1 | 10/2002 | Wynblatt et al. |
| 2003/0046396 A1 | 3/2003 | Richter et al. |
| 2003/0115324 A1 | 6/2003 | Blumenau et al. |
| 2003/0172059 A1 | 9/2003 | Andrei |
| 2003/0217071 A1 | 11/2003 | Kobayashi et al. |
| 2004/0003087 A1 | 1/2004 | Chambliss et al. |
| 2004/0062106 A1 | 4/2004 | Ramesh et al. |
| 2004/0117441 A1 | 6/2004 | Liu et al. |
| 2004/0193570 A1 | 9/2004 | Yaeger |
| 2005/0050083 A1 | 3/2005 | Jin et al. |
| 2005/0076154 A1 | 4/2005 | Chambliss et al. |
| 2005/0086520 A1 | 4/2005 | Dharmapurikar et al. |
| 2005/0120025 A1 | 6/2005 | Rodriguez et al. |
| 2005/0210202 A1 | 9/2005 | Choubal et al. |
| 2005/0283637 A1 | 12/2005 | Coldicott et al. |
| 2006/0064405 A1 | 3/2006 | Jiang et al. |
| 2006/0101086 A1 | 5/2006 | Ray et al. |
| 2006/0106890 A1 | 5/2006 | Paul et al. |
| 2006/0224451 A1 | 10/2006 | Kerschbrock et al. |
| 2006/0224551 A1 | 10/2006 | Lariba-Pey et al. |
| 2006/0277439 A1 | 12/2006 | Davia et al. |
| 2007/0124415 A1 | 5/2007 | Lev-Ran et al. |
| 2007/0220348 A1 | 9/2007 | Mendoza et al. |
| 2007/0239680 A1 | 10/2007 | Oztekin et al. |
| 2007/0260819 A1 | 11/2007 | Gao et al. |
| 2008/0016074 A1 | 1/2008 | Ben-dyke et al. |
| 2008/0016283 A1 | 1/2008 | Madter |
| 2008/0046736 A1 | 2/2008 | Arimilli et al. |
| 2008/0104283 A1 | 5/2008 | Shin et al. |
| 2008/0147599 A1 | 6/2008 | Young-Lai |
| 2008/0155229 A1 | 6/2008 | Beyer et al. |
| 2008/0177803 A1 | 7/2008 | Fineberg et al. |
| 2008/0208861 A1 | 8/2008 | Ray et al. |
| 2008/0222311 A1 | 9/2008 | Lee et al. |
| 2008/0244209 A1 | 10/2008 | Seelam et al. |
| 2008/0307266 A1 | 12/2008 | Chandrasekaran |
| 2009/0024384 A1 | 1/2009 | Kobayashi et al. |
| 2009/0034377 A1 | 2/2009 | English et al. |
| 2009/0063591 A1 | 3/2009 | Betten et al. |
| 2009/0119295 A1 | 5/2009 | Chou et al. |
| 2009/0248871 A1 | 10/2009 | Takase et al. |
| 2010/0082648 A1 | 4/2010 | Potapov et al. |
| 2010/0122026 A1 | 5/2010 | Umamageswaran et al. |
| 2010/0191717 A1 | 7/2010 | Graefe |
| 2010/0191749 A1 | 7/2010 | Liu |
| 2010/0211577 A1 | 8/2010 | Shimizu et al. |
| 2010/0332901 A1 | 12/2010 | Nussbaum et al. |
| 2011/0055232 A1 | 3/2011 | Graefe |
| 2011/0066791 A1 | 3/2011 | Goyal et al. |
| 2011/0099179 A1 | 4/2011 | Balebail |
| 2011/0302178 A1 | 12/2011 | Liu |
| 2012/0072776 A1 | 3/2012 | Ng et al. |
| 2012/0144234 A1 | 6/2012 | Clark et al. |

FOREIGN PATENT DOCUMENTS

| | | |
|---|---|---|
| JP | 2003-150419 A | 5/2003 |
| JP | 2004-038758 A | 2/2004 |

OTHER PUBLICATIONS

U.S. Appl. No. 12/606,109, filed Oct. 26, 2009, Final Office Action, Mar. 9, 2012.

U.S. Appl. No. 12/606,109, filed Oct. 26, 2009, Notice of Allowance, Mar. 9, 2012.

IBM, "A Scheduling Algorithm for Processing Mutually Exclusive Workloads in a multi-systems Configuration," Aug. 19, 2002, IEEE, pp. 1-3.

Oracle Database Administrator's Guide, 10g Release 2 (10.2), Chapter 24, May 2006, 34 pages, http://download.oracle.com/docs/cd/B19306_01/server.102/b14231.pdf.

Oracle Database Administrator's Guide, 11 g Release 2 (11.2), Chapter 26, Feb. 2010, 54 pages. http://download.oracle.com/docs/cd/E11882.01/server.112/e10595.pdf.

PCT/US2009/057526 International Search Report and Written Opinion mailed Sep. 18, 2009, 17 pages.

Current claims, PCT/US2009-057526 filed Sep. 18, 2009, 10 pages.

O'Neil, P. et al., "Multi-table joins through bitmapped join indices," SIGMOD Record, ACM, New York, NY, US, vol. 24, No. 3, Sep. 1, 1995, pp. 8-11, ISSN 0163-5808.

Mackert, F. et al., "R* optimizer validation and performance evaluation for local queries" SIGMOD Record, ACM, New York, NY, US, vol. 15, No. 2, Jun. 1, 1986, pp. 85-95, ISSN: 0163-5808.

Zhe, L. et al., "PERF join: an alternative to two-way semijoin and Bloomjoin" Proceedings of the 1995 ACM CIKM International Conference on Information and Knowledge Management ACM New York, NY, US, 1995, pp. 187-144, ISBN: 0-89791-812-6.

Loizos, M. et al., "Improving distributed join efficiency with extended bloom filter operations," Advanced Networking and Applications, 2007. AINA '07, 21st International Conference on IEEE, PL. May 1, 2007, pp. 187-194, ISBN: 9780-7695-2846-5.

PCT/US2009/057590 International Search Report and Written Opinions mailed Feb. 2, 2010, 16 pages.

Current claims, PCT/US2009-057590 filed Sep. 18, 2009, 10 pages.

U.S. Appl. No. 11/716,364, filed Mar. 8, 2007, Final Office Action, Nov. 6, 2012.

U.S. Appl. No. 12/562,984, filed Sep. 18, 2009, Final Office Action, Nov. 1, 2012.

U.S. Appl. No. 12/691,146, filed Jan. 21, 2010, Examiners Answers, mailed Apr. 29, 2013.

US 8,521,923 B2

STORAGE-SIDE STORAGE REQUEST MANAGEMENT

CROSS-REFERENCE TO RELATED APPLICATIONS; BENEFIT CLAIM

This application claims benefit under 35 U.S.C. §120 as a Continuation of application Ser. No. 12/563,073, filed Sep. 18, 2009, now U.S. Pat. No 8,145,806 which in turn claims benefit under 35 U.S.C. §119(e) of Provisional Applications Nos. 61/192,668, filed Sep. 19, 2008, and 61/099,872, filed Sep. 24, 2008. The entire contents of each of the above-listed applications are hereby incorporated by reference for all purposes as if fully set forth herein. The applicant(s) hereby rescind any disclaimer of claim scope in the parent application(s) or the prosecution history thereof and advise the USPTO that the claims in this application may be broader than any claim in the parent application(s).

FIELD OF THE INVENTION

The present invention relates to storage request management and, more specifically, to storage-side management of I/O requests.

BACKGROUND

The primary role of database systems is to translate high-level, abstract declarations of data objects, and manipulations and searches for those objects. Ideally, those declarations and manipulations are translated efficiently by database systems into I/O requests sent to simple, linearly addressed, blocked, persistent storage devices. Often, database systems must perform such translations for multiple applications. Those applications may use multiple databases across different user and schema security levels, application types, database session types, and priorities and classes of I/O requests.

In many situations, the order in which I/O requests are sent to a storage system impacts the efficiency of the system. For example, when both a small, high-priority I/O request and a large, low-priority I/O requests need to be sent to a storage system, it would not be efficient for a database server to send the large, low-priority I/O request ahead of the small high-priority I/O request.

Various techniques have been developed to ensure that I/O requests are sent to storage systems in an intelligent manner. For example, U.S. patent application Ser. No. 11/716,364, entitled "Management Of Shared Storage I/O Resources", which is incorporated herein by this reference, describes techniques for queuing I/O requests within a database server, and issuing those requests to a storage system in an intelligent manner. However, having database servers issue I/O requests in an intelligent manner does not ensure the optimal handling of the I/O requests by the storage system.

Specifically, storage systems typically handle I/O requests on a First-In-First-Out (FIFO) basis. To the extent that storage systems deviate from FIFO processing, the deviation involves reordering I/O requests to improve disk efficiency. Such reordering is performed without any regard for the purpose behind the I/O requests. Consequently, when multiple database servers are sending I/O requests for multiple databases to the same storage system (or the same storage device within a storage system), the storage system may end up processing lower priority I/O requests before processing higher priority I/O, even though each individual database server is independently issuing its I/O requests to the storage system in an optimal sequence.

Multiple types of workloads and databases often share storage. Unfortunately, running multiple types of workloads and databases on shared storage often leads to performance and response time problems between applications and mixed workloads. For example, large parallel queries on one production data warehouse can impact the performance of critical queries on another production data warehouse. Also, a data load on a data warehouse can impact the performance of critical queries also running on the same data warehouse. It is possible to mitigate these problems by over-provisioning the storage system, but this diminishes the cost-savings benefit of shared storage. It is also possible to schedule non-critical tasks at off-peak hours, but this manual process is laborious. It becomes impossible when databases have different administrators who do not coordinate their activities.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

Figure 1:
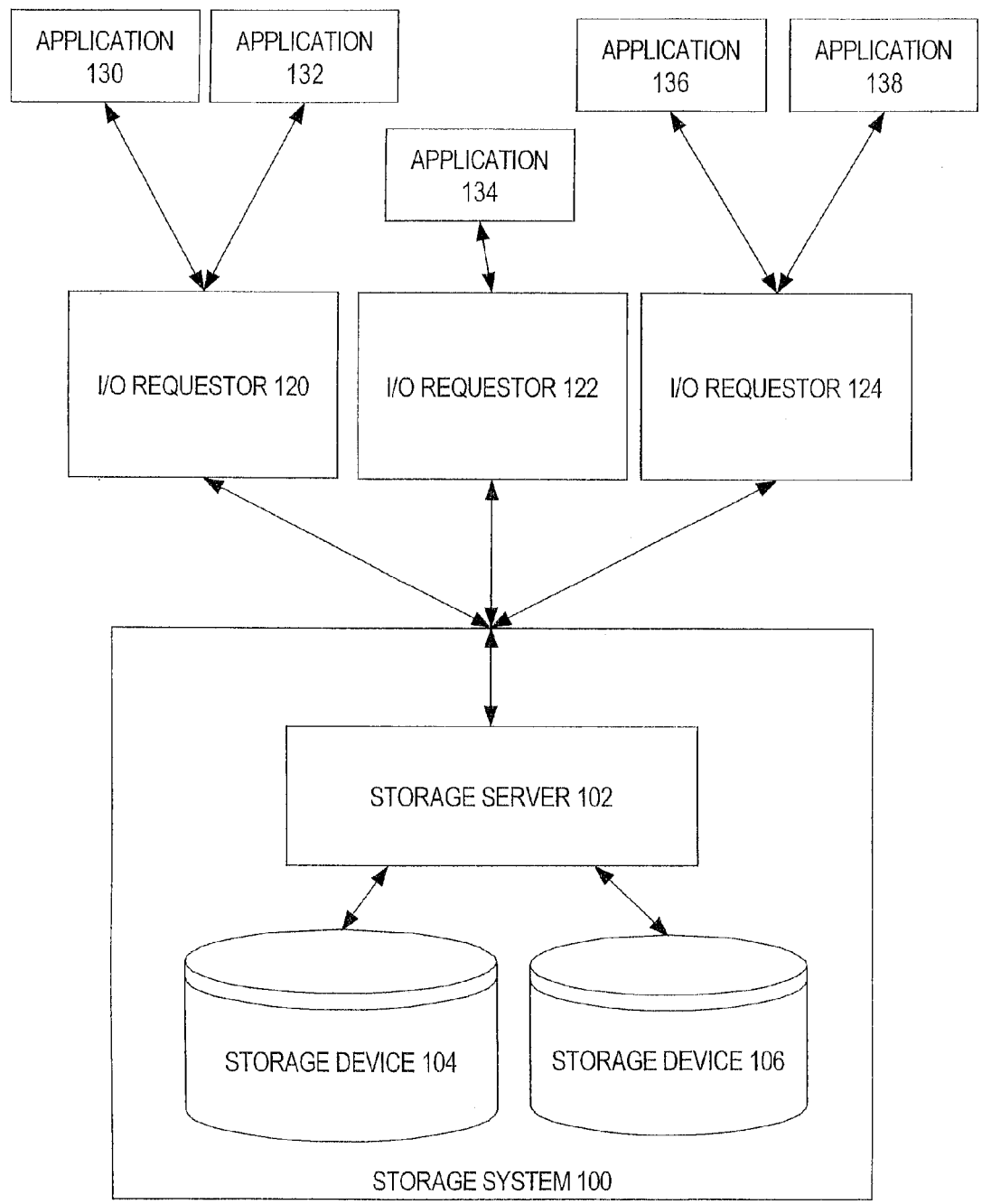
FIG. 1 is a block diagram of a storage server configured to received requests from, and intelligently order, I/O requests from multiple I/O requestors.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

Techniques are described herein for managing, within a storage system, the sequence in which I/O requests are processed by the storage system based, at least in part, on one or more logical characteristics of the I/O requests. The logical characteristics may include, for example, the identity of the user for whom the I/O request was submitted, the service that submitted the I/O request, the database targeted by the I/O request, an indication of a consumer group to which the I/O request maps, the reason why the I/O request was issued, a priority category of the I/O request, etc. Such logical characteristics differ fundamentally from the physical characteristics of the I/O requests, such as the storage location of the data targeted by the I/O request and the amount of data involved in the I/O operation specified by the I/O request.

The in-storage I/O management techniques described herein may be employed instead of or in addition to any management performed within I/O requestors that are issuing the I/O requests to the storage system. As used herein, "I/O requestor" refers to any entity that issues an I/O request to a storage system. I/O requestors may be, for example, database servers that issue the I/O requests in response to database commands received from database applications. However, the techniques described herein are not limited to any particular type of I/O requestor.

Because the storage system handles all I/O requests that are directed the storage devices within the storage system, the storage system is better situated than the I/O requestors to make intelligent scheduling decisions about how to schedule the I/O requests that have been directed to those storage devices. For example, the storage system is able to determine that a high-priority I/O request that targets a particular storage device should be handled before a low-priority I/O request that targets the same storage device, even though the two requests came from different I/O requestors and target two different databases.

The logic, contained within the storage system, for managing the I/O requests is referred to herein as the "storage server" of the storage system. A storage server may be implemented by software executing on processors that are part of the storage system, by hard-wired logic, or by any combination of software and hardware. The I/O requests that have been received by the storage server, but have not yet been issued (e.g. added to an output queue of the storage system), are referred to herein as "pending I/O requests". I/O requests that have been issued to a storage device, but have not yet been completed, are referred to herein as "outstanding I/O requests".

The logical characteristics of the work associated with an I/O request are not conventionally available to a storage system. Therefore, in one embodiment, the logical characteristics of I/O requests are communicated to the storage system from other entities in the form of "request metadata". For example, in one embodiment, the I/O requestors provide the storage server with request metadata along with the I/O requests. As explained above, the request metadata specifies logical characteristics about the work represented by the I/O requests. Based on those logical characteristics, a scheduling policy, and a selection policy, the storage server determines when to issue each I/O request. As shall be described in greater detail below, the storage server may immediately issue an I/O request, or may queue the request for deferred issuance.

In one embodiment, when more than one I/O request is pending and the scheduling policy indicates that an I/O request should be issued, which pending I/O request to issue is determined by one or more selection policies. The various policies specified in a selection policy may be applied in phases. During each phase, the number of pending I/O requests that are considered candidates for selection is reduced based on the policies that belong to that phase. When only one non-empty waiting queue of pending I/O requests remains as a candidate, the storage server selects the I/O request that resides at the head of that waiting queue for processing.

Examples of policies that may be specified in a selection policy include:

- 70% of storage performance capacity should be allocated to data warehouse finance, and 30% of storage performance capacity should be allocated to data warehouse sales
- Production databases should have priority over test and development databases
- OLTP workloads should have priority over maintenance workloads

EXAMPLE SYSTEM

FIG. 1 is a block diagram of a system on which the I/O request management techniques described herein may be implemented. Referring to FIG. 1, a storage system 100 provides storage for data used by several different applications 130, 132, 134, 136 and 138. Those applications make use of storage system 100 indirectly, by sending commands to I/O requestors 120, 122 and 124. For example, applications 130, 132, 134, 136 and 138 may be various database applications, and I/O requestors 120, 122 and 124 may be database servers that respond to the database commands by storing, retrieving, and manipulating data stored on databases spread over storage devices 104 and 106.

In the illustrated embodiment, applications 130 and 132 interact with I/O requestor 120, application 134 interacts with I/O requestor 122, and applications 136 and 138 interact with I/O requestor 124. In actual implementations, the number and type of applications that concurrently interact with an I/O requestor may vary.

As mentioned above, I/O requestors 120, 122 and 124 may implement some form of internal I/O request scheduling policies. However, those internal policies do not ensure intelligent scheduling when, for example, both I/O requestor 120 and I/O requestor 122 submit I/O requests that target storage device 104. To intelligently manage I/O requests under such circumstances, policies are registered with storage server 102, and storage server 102 applies those policies to incoming I/O requests.

SCHEDULING And SELECTION POLICIES

According to one embodiment, there are two separate policies within the storage server 102: a scheduling policy and a selection policy. The scheduling policy determines when an I/O should be issued. For example, the scheduling policy might be aimed at keeping throughput reasonably high. In this case, the storage server 102 would allow a relatively high number of outstanding I/Os. I/Os would only be queued once this limit is hit. Another example would be a scheduling policy that aims to keeping the latencies reasonably low. In this case, the storage server 102 would allow a relatively low number of outstanding I/Os. In either case, once this limit is hit, any new I/Os would be queued. When the number of outstanding I/Os (the current I/O load on the disks) has reached a certain level, "saturation" occurs.

When, based on the scheduling policy, the storage server 102 decides to issue an I/O request, the storage server 102 decides which I/O to issue based on the selection policy. The techniques described herein may be used with any selection policy. For the purpose of explanation, various types of selection policies will be described hereafter. However, the techniques described herein are not dependent on the type of selection policy used. Typically, the selection policy implemented by the storage server 102 will hinge, for example, on the way the storage is to be used.

Typically, in situations where the storage is shared by multiple databases, the selection policy will include a policy for picking an I/O request based on the database targeted by the I/O request. As shall be described in greater detail hereafter, the policy for picking the database can be ratio-based, priority-based, a hybrid of the two.

On the other hand, if the storage is used by a single database, then the selection policy may include a policy for picking an I/O request based on workload associated with the I/O request. The workload-based selection policy can also be ratio-based, priority-based, or a hybrid of the two.

Finally, if the storage is shared by multiple databases and the databases have multiple workloads within them, then the selection policy may involve a two-phased plan, where the first phase of the plan selects a database, and the second phase of the plan selects a workload within that database.

According to one embodiment, the techniques described herein, as well as the scheduling policies and selection policies, are applied independently to each storage device within the storage system. Thus, if there are twelve disks in the storage system, then the load settings, queues, etc. are specified per disk. Per-disk load settings, queues and policies are useful because, while all disks are managed by the same storage system, each disk operates independent of the others.

THE SCHEDULING POLICY

As mentioned above, the storage server 102 issues I/O requests to the storage system up to the point that the storage system reaches a target, optimal load. As used herein, the term "load" refers to the total cost of the outstanding, incomplete I/O requests. The cost of an individual I/O request is determined by the amount of time the I/O request will utilize the storage system resources. Therefore, an I/O request to read a small amount of data has a much lower cost than an I/O request to read a large amount of data, since it occupies the disk I/O resources for a much shorter amount of time.

According to one embodiment, the cost of an I/O request is pre-determined by calibrating the storage system. Once the target load has been reached, the storage system queues all subsequent I/O requests. When enough I/O requests have completed so that the storage system is under its target load, the storage server uses the selection policy to choose enough I/O requests to bring the storage system back to its target load.

The setting of the target load determines the performance characteristics of the storage system. If the target load is low, then the latency of the I/O requests will be low. As the target load is increased, then the throughput of the storage will increase, leading to better I/O throughput. This is because storage systems work more efficiently at higher loads. However, the latency of the I/O requests will decrease, due to the increased load.

The size of the target load is referred to herein as the "load setting". The load setting that is implemented by the scheduling policy can be established in many different ways. For example, the load setting could be hard-coded at a level that should work well for most people. Alternatively, the load setting could be set by the storage administrator specifying whether the storage system should be optimized for latency, throughput, or a compromise between the two. As another example, the load setting can be automatically determined by the storage server by looking at each workload. Using the meta-data and other workload characteristics, the storage server can determine whether the workload would be preferred to be optimized for latency or throughput. The storage server can use the selection policy to weigh the preference of each workload to determine an overall load setting. For example, the preference of a high priority database would be weighed more than the preference of a lower priority database.

In a system where the load setting is automatically determined by the storage server, the storage system may select the scheduling policy based on the usage characteristics of the storage system, as reflected in the registered selection policy (s) and/or the request metadata. Thus, if the I/O requests received by the storage system are primarily for data warehousing operations, which tend to be throughput intensive, the storage system may select scheduling policy that that has a higher load setting. For example, the storage system may be configured to allow the storage system's output I/O queue to include up to eight one-Megabyte I/Os requests at any given time. A higher load setting allows a greater volume of I/Os to be issued to the storage devices within the storage system, keeping the storage devices as busy as possible.

On the other hand, if the majority of the I/O requests are for OLTP workloads, a scheduling policy with a lower load setting may be selected, to optimize for latency rather than throughput. Because of the lower load setting, I/O requests will tie up storage devices for shorter periods of time. Because the storage devices are tied up for shorter periods of time, the storage devices will be more available to process newly-arrived high-priority I/O requests. Thus, users that are performing the operations that produced those high-priority I/O requests will experience less storage system latency.

According to one embodiment, the storage system determines the characteristics of the overall workload based on the selection policies that are registered with the storage system and/or the request metadata that accompanies the requests. For example, a selection policy may indicate that applications for which the storage system is being used are data warehousing applications. Alternatively, the selection policy may not indicate the type of applications, but the request metadata received with the I/O requests may indicate that the vast majority of I/O requests are from data warehousing applications.

Even when selection policies indicate the nature of workloads that are using the storage system, the storage server may use the request metadata to determine how much each of the workloads is actually using the storage. For example, a selection policy may indicate that the storage system is being used by two OLTP applications and two warehousing applications. Based on this information alone, it may be unclear what the optimal load setting would be. However, if 90% of the I/O requests that are actually received by the storage server are from the two OLTP applications, then the storage system may select an load setting that is optimized for OLTP applications.

According to one embodiment, the load setting selection process is repeated periodically, so that the load settings can dynamically change as the workload changes. For example, in one embodiment, the selection process is made based on the I/O requests that have been received by the storage system within a particular time period, such as the last five seconds. The workload represented by the I/O requests received during that period may differ significantly from the workload represented in I/O requests that were received in prior periods. The load setting is then changed to reflect the result of the most recent load setting selection operation. Thus, during periods where a storage server is used primarily for data warehouse operations, the load setting will automatically be optimized for throughput, and during periods in which the same storage system is used primarily for OLTP operations, the load setting will automatically be optimized for reduced latency.

REQUEST METADATA

To implement a selection policy, the storage server 102 needs to know information about the I/O requests that it receives. For example, if the selection policy is based on the workload associated with I/O requests, then storage server 102 needs to know the workloads to which the I/O requests belong. According to one embodiment, the information required by storage server 102 to implement the selection policy is provided to storage server 102 as "request metadata" that accompanies the requests. The metadata that accompanies the I/O requests, and how that metadata is used by storage server 102 to make intelligent decisions about I/O scheduling, shall be described in greater detail hereafter.

WAITING QUEUES

When the storage system 100 is operating below the capacity dictated by the scheduling policy, storage server 102 will not queue I/O requests. In particular, as long as the storage system's capacity is not saturated, I/O requests received by storage server 102 are immediately processed. The I/O requests may be processed, for example, by placing the I/O requests into an output I/O queue. However, whenever the I/O requests start to saturate storage system 100, storage server 102 will defer the execution of incoming I/O requests by placing the received I/O requests into waiting queues.

For example, if production and test databases are sharing storage system 100, selection policies can be configured that give priority to I/O requests that target the production database. In this case, whenever the test database load would affect the production database performance, storage server 102 will schedule the I/O requests such that the production database I/O performance is not impacted. This means that the test database I/O requests will be placed in a waiting queue until they can be processed without disturbing the production database I/O performance.

The waiting queue into which a deferred I/O request is placed is based on the logical characteristics indicated by the request metadata that accompanies the I/O request. When the scheduling policy indicates that additional I/O requests should be issued, storage server 102 selects which deferred I/O requests to process based on the registered selection policies, and the waiting queue in which the I/O requests reside.

RATIO-BASED SELECTION POLICIES

According to one embodiment, the selection policies that are registered with storage server 102 may include ratio-based policies, priority-based policies, and hybrid policies. Ratio-based policies are policies that allocate the load between requests having different logical characteristics based on ratios that are assigned to those logical characteristics. For example, assume that the logical characteristic that is to be used as the basis for a ratio-based policy is the database that is targeted by the I/O requests (the "targeted-database characteristic"). Assume further that five databases DB1, DB2, DB3, DB4 and DB5 are stored on the storage devices 104 and 106. A ratio-based policy may specify that storage server 102 should allocate load among the five databases as follows:

DB1=50%, DB2=20%, DB3=20%, DB4=5% and DB5=5%.

Based on the ratio-based policy, storage server 102 processes pending I/O requests in a sequence to ensure that the I/O requests that target databases that are below their allocation ratios are processed before I/O requests that target databases that are above their allocation ratios.

In one embodiment, storage server 102 makes a "furthest behind" determination based on the ratios assigned to the various databases. For example, assume that, when storage server 102 is ready to select another I/O request to process, DB2, DB4 and DB5 have pending I/O requests. Under these circumstances, storage server 102 determines which of DB2, DB4 and DB5 is furthest behind in its respective allocation. For the purpose of explanation, assume that DB2 has already used 22% of the load, DB4 has used 4% and DB5 has used 3%. Under these circumstances, storage server 102 would select a pending I/O request that targets DB5.

Ratio-based policies are useful to ensure that higher priority entities receive a greater amount of bandwidth, while still ensuring that no entity is left out completely. In the above example, DB2 is generally more important than DB5 because DB2 has been allocated 20% of the load (while DB5 has been allocated only 5%). However, because DB2 had already used more than its allocated portion of the load, an I/O request from DB5 was processed ahead of an I/O request from DB2.

RATIO-BASED POLICIES USING PROBABILITIES

In the embodiment described above, a ratio-based policy is implemented by keeping track of which database that is "furthest behind" relative to its load allocation. Unfortunately, a "furthest behind" determination incurs the overhead of keeping track of which I/O requests have been previously issued. To avoid this overhead, the storage server 102 can simply treat the load allocations that are specified by the ratio-based policy as "probabilities" that I/O requests will be selected.

For example, assume that each of databases DB1, DB2, DB3, DB4 and DB5 has at least one pending I/O request. Under these conditions, all of the databases would be selection candidates. Consequently, the probability that a given database will be selected will equal the percentage of the load that the database was allocated. Specifically, there would be a 50% probability that the storage server 102 would select an I/O request that targets DB1, a 20% probability that the storage server 102 would select an I/O request that targets DB2, etc.

On the other hand, if only DB2 and DB5 have pending I/O requests, then DB2 and DB5 would be the only selection candidates. DB2 has a 20% load allocation and DB5 has a 5% load allocation. Under these circumstances, the relative load allocations of DB2 and DB5 would result in an 80% probability that the I/O request that targets DB2 would be selected, and a 20% probability that the I/O request that targets DB5 would be selected.

Once the probabilities have been determined for the various selection candidates, storage server 102 performs the I/O request selection based on the probabilities. One way of selecting an I/O request based on the probabilities involves assigning a sub-range of a range to each of the selection candidates, where the size of the sub-range that is assigned to each selection candidate is determined by the probability that the selection candidate will be selected.

For example, assume that the range is 1 to 100. Further assume that the only I/O request candidates are an I/O request that targets DB2, and an I/O request that targets DB5. Under these circumstances, the DB2 would have a selection probability of 80%. Therefore, the I/O request that targets DB2 may be assigned sub-range 1-80 (i.e. 80% of the entire range). On the other hand, DB5 would have a selection probability of 20%, and therefore may be assigned sub-range 81-100 (i.e. 20% of the entire range).

After each selection candidate has been assigned a sub-range within the range, storage server 102 may generate a random number within the range. The sub-range into which the random number falls determines which selection candidate the storage server 102 selects. Thus, in the present example, if the random number falls between 1 and 80, the I/O request that targets DB2 will be selected. On the other hand, if the random number falls between 81 and 100, then the I/O request that targets DB5 will be selected.

PRIORITY-BASED POLICIES

Priority-based policies are policies that assign a relative importance to the values of a logical characteristic of the candidate I/O requests. For example, assume that the logical characteristic that is to be used as the basis for a priority-based policy is the targeted-database characteristic. In a storage system that stores data for databases DB1, DB2, DB3, DB4 and DB5, the possible values of the targeted-database characteristic are DB1, DB2, DB3, DB4 and DB5. Consequently, a priority-based policy that uses the targeted-database characteristic may specify that I/O requests that target DB1, DB2, DB3, DB4 and DB5 have first, second, third, fourth and fifth priority, respectively.

When a priority-based policy is used, no I/O requests that have a lower-priority logical characteristic value are processed as long as there are pending I/O requests that are associated with a higher-priority logical characteristic value. Thus, as long as any I/O requests that target DB1 are pending, I/O requests that target DB2, DB3, DB4 and DB5 will not be selected by storage server 102. On the other hand, I/O requests that target DB5 will not be selected by storage server 102 until there are no pending I/O requests that target any of DB1, DB2, DB3, and DB4. Priority-based policies ensure that I/O requests associated with lower-priority logical characteristics never adversely impact the performance of I/O requests associated with higher-priority logical characteristics.

HYBRID POLICIES

Hybrid policies are policies that incorporate both priority levels and ratios. Specifically, multiple logical characteristics may be assigned to each priority level. Within each priority level, ratios are assigned to each of the logical characteristics. For example, I/O requests that target DB1, DB2 and DB3 may all be assigned to the first priority level. Within the first priority level, I/O requests that target DB1, DB2 and DB3 may be assigned the ratios 50, 40 and 10, respectively. I/O requests that target DB4 and DB5 may be assigned to the second priority level. Within the second priority level, I/O requests that target DB4 and DB5 may be assigned the ratios 70 and 30, respectively.

According to this example, storage server 102 will allocate load between I/O requests that target DB1, DB2 and DB3 according to their respective ratios. As long as any of the pending I/O requests target DB1, DB2 or DB3, storage server 102 will not process any I/O requests that target DB4 or DB5. If no pending I/O requests target DB1, DB2 or DB3, then the load will be allocated between I/O requests that target DB4 and DB5 based on the ratios 70 and 30, respectively.

DATABASE-SELECTION POLICIES

As illustrated in the examples given above, the database to which an I/O request is targeted is one logical characteristic that may be used as the basis for a policy. Policies for selecting between I/O requests based on the targeted-database characteristic are referred to herein as "database-selection policies". Examples of database-selection policies include:

70% of storage performance capacity should be allocated to data warehouse finance, and 30% of storage performance capacity should be allocated to data warehouse sales Production databases should have priority over test and development databases Database-selection policies may be simple or complex. Table 1 illustrates a three-level hybrid database-selection policy:

TABLE 1

| Database | Level 1 | Level 2 | Level 3 |
|---|---|---|---|
| Sales Production Data Warehouse | 80% | | |
| Finance Production Data Warehouse | 20% | | |
| Customer Service Standby Database | | 100% | |
| Sales Test Database | | | 50% |
| Sales Development Database | | | 50% |

Referring to Table 1, it illustrates database-selection policies for a system that includes five databases. At the first priority level, the Sales Production Data Warehouse is assigned 80% of the load, and the Finance Production Data Warehouse is assigned 20% of the load. As long as either of these two level 1 databases have pending I/Os, the storage server will not issue I/Os for any of the other three databases. Only when no I/O requests are pending for the level 1 databases will I/O requests that target the Customer Service Standby Database be added to an output I/O queue by the storage server. Similarly, only when no I/O requests are pending for level 1 or level 2 databases will the load be divided 50/50 between I/O requests that target the Sales Test Database and the Sales Development Database.

CONSUMER-GROUP-SELECTION POLICIES

A database often has many types of workloads. These workloads may differ in their performance requirements and the amount of I/O they issue. "Consumer groups" provide a way to group sessions that comprise a particular workload. For example, if a database stores data for four different applications, then four consumer groups can be created, one for sessions for each application. Similarly, if a data warehouse has three types of workloads, such as critical queries, normal queries, and ETL (extraction, transformation, and loading), then a consumer group can be created for each type of workload.

Thus, the "consumer group" of an I/O request is a logical characteristic of the I/O request that is derived from the values of one or more other logical characteristics of the I/O request. In one embodiment, the consumer group to which an I/O request belongs is based on a "logical-characteristic-value-to-consumer-group" mapping that maps logical characteristic values to consumer groups. For example, the consumer group of an I/O request may be derived from one or more of the following logical characteristic values: (1) a service identifier, (2) a user identifier, (3) a program name, (4) a purpose identifier, and (5) statistics about the operation that submitted the I/O request.

Figure 2:
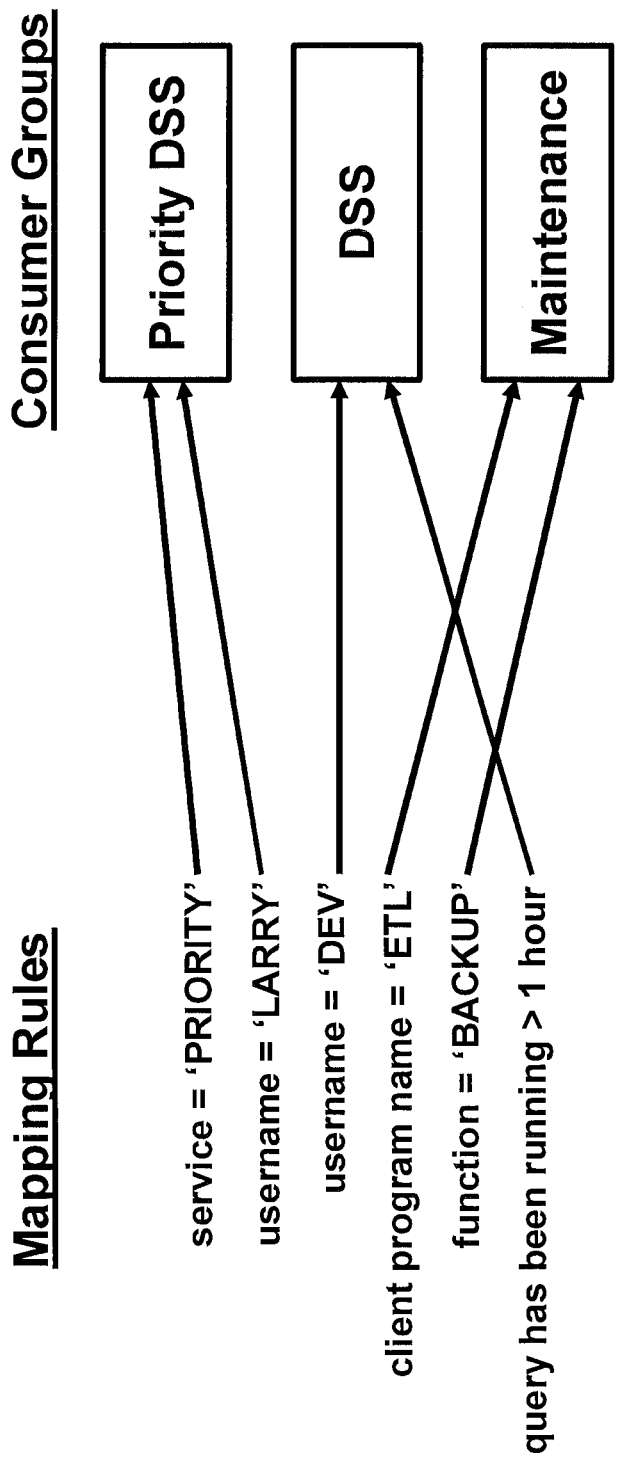
FIG. 2 is a block diagram illustrating how various request metadata values may be mapped to consumer groups, according to an embodiment of the invention.

Referring to FIG. 2, it is a block diagram illustrating a mapping between logical characteristic values and consumer groups, according to an embodiment of the invention. In the mapping illustrated in FIG. 2, three consumer groups have been defined: Priority DSS, DSS, and Maintenance. According to the illustrated mapping, the Priority DSS consumer group includes all I/O requests where either the service is "PRIORITY" or the username is "LARRY". The DSS consumer group includes all I/O requests where either the username is "DEV" or the query has been running for more than one hour. The Maintenance consumer group includes all I/O requests where either the client program name is "ETL" or the function of the I/O request is "BACKUP".

When consumer group membership is defined by logical-characteristic-value-to-consumer-group mappings, a single I/O request may have logical characteristic values that map to several different consumer groups. For example, an I/O request may have a user identifier of "LARRY", a client program identifier of "DEV" and a purpose identifier of "BACKUP". According to one embodiment, logical-characteristic-value-to-consumer-group mappings indicate how to resolve situations in which the logical characteristic values of an I/O request map to multiple consumer groups. For example, a logical-characteristic-value-to-consumer-group mapping may indicate that username is the most significant logical characteristic value, followed by service, program statistics, function, and finally client program. Under such a selection policy, an I/O request that has a user identifier of "LARRY", a client program identifier of "DEV" and a purpose identifier of "BACKUP" would be mapped to the Priority DSS consumer group.

A logical-characteristic-value-to-consumer-group mapping may also have a "default" consumer group. In one embodiment, if none of the logical characteristic values of an I/O request maps to any other consumer group, then the I/O request is treated as belonging to the default consumer group.

Similar to database-selection policies, consumer-group policies may be ratio-based, priority-based or hybrid. A hybrid consumer-group policy is illustrated in Table 2:

TABLE 2

| Consumer Group | Level 1 | Level 2 |
|---|---|---|
| Priority DSS | 80% | |
| Maintenance | 20% | |
| DSS | | 100% |

According to the hybrid consumer-group policy illustrated in Table 2, I/O requests that map to the Priority DSS consumer group are allocated 80% of the load, while I/O requests that map to the Maintenance consumer group are allocated 20% of the load. I/O requests that map to the DSS consumer group are only issued by the storage server when there are no pending I/O requests that belong to either of the other two consumer groups.

In one embodiment, I/O requestors use logical-characteristic-value-to-consumer-group mappings to determine the consumer-groups to which their I/O requests belong, and include a consumer-group identifier in the request metadata that they send with each I/O request. In embodiments where consumer-group identifiers are included in the request metadata, the logical characteristics from which the consumer-group is derived need not also be included in the request metadata.

In an alternative embodiment, the consumer-group of an I/O request is not directly indicated in the request metadata received by the storage system from the I/O requestors. Instead, the logical-characteristic-value-to-consumer-group mappings are provided to the storage system, and the storage server within the storage system determines the consumer group of each I/O request based on (a) the logical characteristic values reflected in the request metadata, and (b) the logical-characteristic-value-to-consumer-group mappings.

CATEGORY-SELECTION POLICIES

According to one embodiment, one logical characteristic of an I/O request is referred to herein as the "category" of the I/O request. Typically, the category of an I/O request indicates the type of workload associated with the I/O request. For example, a category-selection policy may define three categories: critical, somewhat-critical, and not-critical.

Category-selection policies indicate policies for selecting among I/O request candidates based on the category to which the I/O request candidates belong. Similar to database-selection policies and consumer-group based policies, category-selection policies may be ratio-based, priority-based, or hybrid. For example, a priority-based category-selection policy may specify that critical I/O requests have the highest priority, somewhat-critical I/O requests have medium priority, and not-critical I/O requests have low priority.

THE POLICY-TO-PHASE ASSIGNMENT

Figure 3:
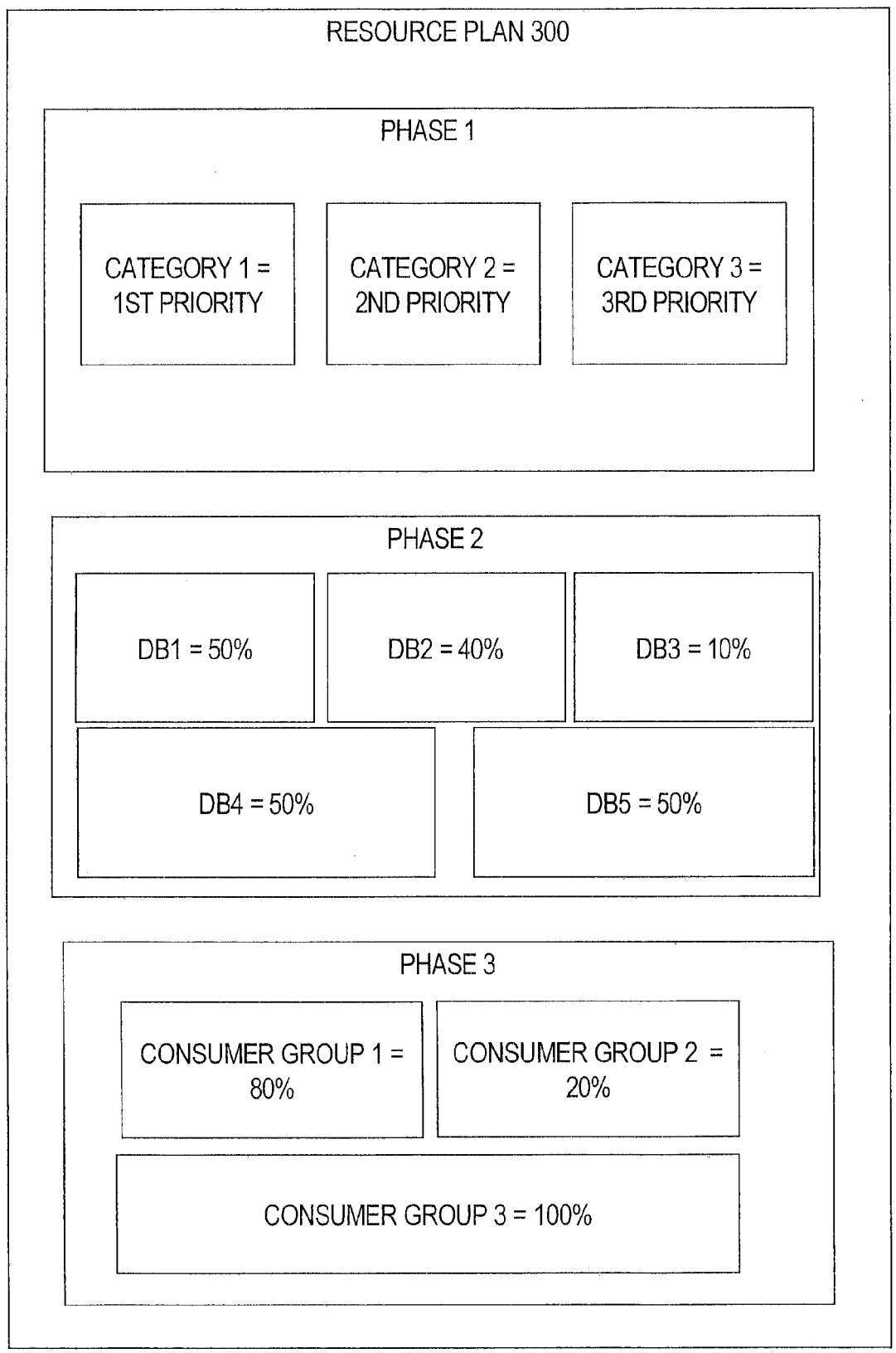
FIG. 3 is a block diagram of a three-phase selection policy, according to an embodiment of the invention.

As mentioned above, the storage server may apply the policies specified in a selection policy in phases. The choice of which policies to assign to each phase is itself a policy decision that may be indicated in the selection policy. FIG. 3 is a block diagram illustrating a selection policy 300 in which policies have been assigned to three phases: phase 1, phase 2 and phase 3. In particular, a priority-based category-selection policy has been assigned to phase 1, a hybrid database-selection policy has been assigned to phase 2, and a hybrid consumer-group-selection policy has been assigned to phase 3.

Within the phase 2 hybrid database-selection policy, the first priority level includes DB1, DB2 and DB3, and the second priority level includes DB4 and DB5. Within the first priority level, DB1, DB2 and DB3 are associated with allocation ratios 50%, 40% and 10% respectively. Within the second priority level, DB4 and DB5 are both associated with allocation ratios of 50%.

Similarly, within the phase 3 hybrid consumer-group-selection policy, the first priority level includes consumer group 1 and consumer group 2, and the second priority level includes consumer group 3. Within the first priority level, consumer groups 1 and 2 are associated with allocation rations 80% and 20%, respectively. Within the second priority level, consumer group 3 has an allocation ratio of 100%.

The pending I/O requests that continue to be candidates after the selection policies in a phase have been applied are referred to herein as the "survivors" of the phase. For example, according to the selection policy 300 of FIG. 3, if there are any pending I/O requests that belong to category 1, then the survivors of phase 1 will only include the pending I/O requests belong to category 1.

On the other hand, if there are no pending I/O requests that belong to category 1, but there is at least one pending I/O request that belongs to category 2, then the survivors of phase 1 will only include the pending I/O requests that belong to category 2. Finally, if there are no pending I/O requests that belong to categories 1 or 2, then the survivors of phase 1 will only include the pending I/O requests belong to category 3.

The policies of a subsequent phase are only applied to the survivors of the previous phase. Thus, the hybrid database-selection policies assigned to phase 2 in selection policy 300 are only applied to the survivors of phase 1. Similarly, the hybrid consumer-group-selection policy assigned to phase 3 is only applied to the survivors of phase 2. Phases continue to be applied until all of the survivors belong to the same waiting queue. The I/O request at the head of that waiting queue is then selected for execution.

Because the phases are applied in sequence, the policies applied in early phases have a greater impact on the ultimate I/O request selection than the policies applied in later phases. Consequently, the policies that deal with more significant logical characteristics are generally assigned to earlier phases than policies that deal with less significant logical characteristics.

For example, in situations where the users of various databases trust each other not to monopolize the load of the storage system, the targeted-database characteristic becomes a less significant logical characteristic. Consequently, the selection policy may not have any database-selection policies, or may assign the database-selection policies to a later phase in the I/O request selection process.

On the other hand, in situations where the users of the various databases might try to monopolize the load, the targeted-database characteristic may be the most significant logical characteristic. Under these circumstances, database-selection policies may be assigned to the first phase performed by the storage server to ensure that an agreed-upon bandwidth allocation between the databases is maintained.

PER-SURVIVOR-GROUP POLICIES

In the examples given above, the policies that are applied by the storage server in subsequent phases are independent of which pending I/O requests survived the previous phases. However, according to one embodiment, the policy that applies in a subsequent phase may hinge on the group of I/O requests that survived the previous phase. Policies that are dependent on which I/O requests survived previous phases are referred to herein as per-survivor-group policies.

For example, phase 2 of FIG. 3 has five possible outcomes. Specifically, because phase 2 applies a database-selection policy, the survivors of phase 2 of FIG. 3 will be I/O requests that target only one of the five databases. In one embodiment, the hybrid consumer-group-selection policy that is illustrated in phase 3 of FIG. 3 may only apply to I/O requests that target DB1. Phase 3 may have completely different policies if the I/O requests that survive phase 2 are I/O requests that target one of the other databases.

Figure 4:
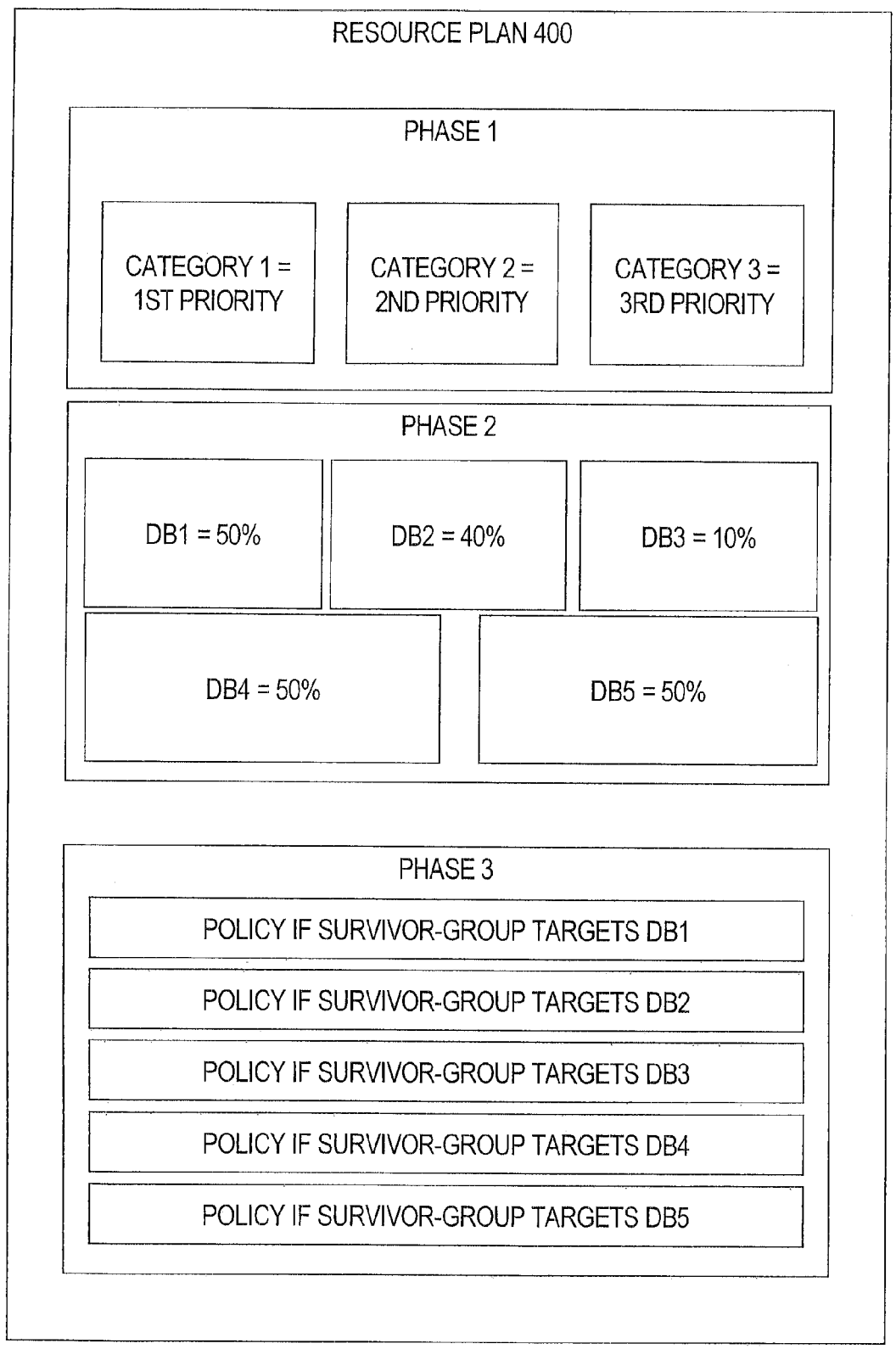
FIG. 4 is a block diagram illustrating per-survivor-group policies, according to an embodiment of the invention.

Referring to FIG. 4, it is a block diagram illustrating a selection policy 400 similar to selection policy 300, in which there is a distinct phase 3 policy for each of the five possible survivor groups of phase 2. The phase 3 policy for I/O requests that target one database may be completely different than the phase 3 policies for I/O requests that target another database. For example, the phase 3 policy that applies to I/O requests that target DB1 may be based on three consumer groups that are determined based on a particular logical-characteristic-value-to-consumer-group mapping, while the phase 3 policy that applies to I/O requests that target DB2 may be based on five consumer groups that are determined based on a different logical-characteristic-value-to-consumer-group mapping.

Because the policies that apply at a particular phase may depend on which I/O requests survive the previous phase, selection policies can be arbitrarily sophisticated. For example, FIG. 5 is a block diagram that illustrates the relationships between the possible survivor groups of each phase of a selection policy 500, and policies that are applied by the storage server in subsequent phases.

Figure 5:
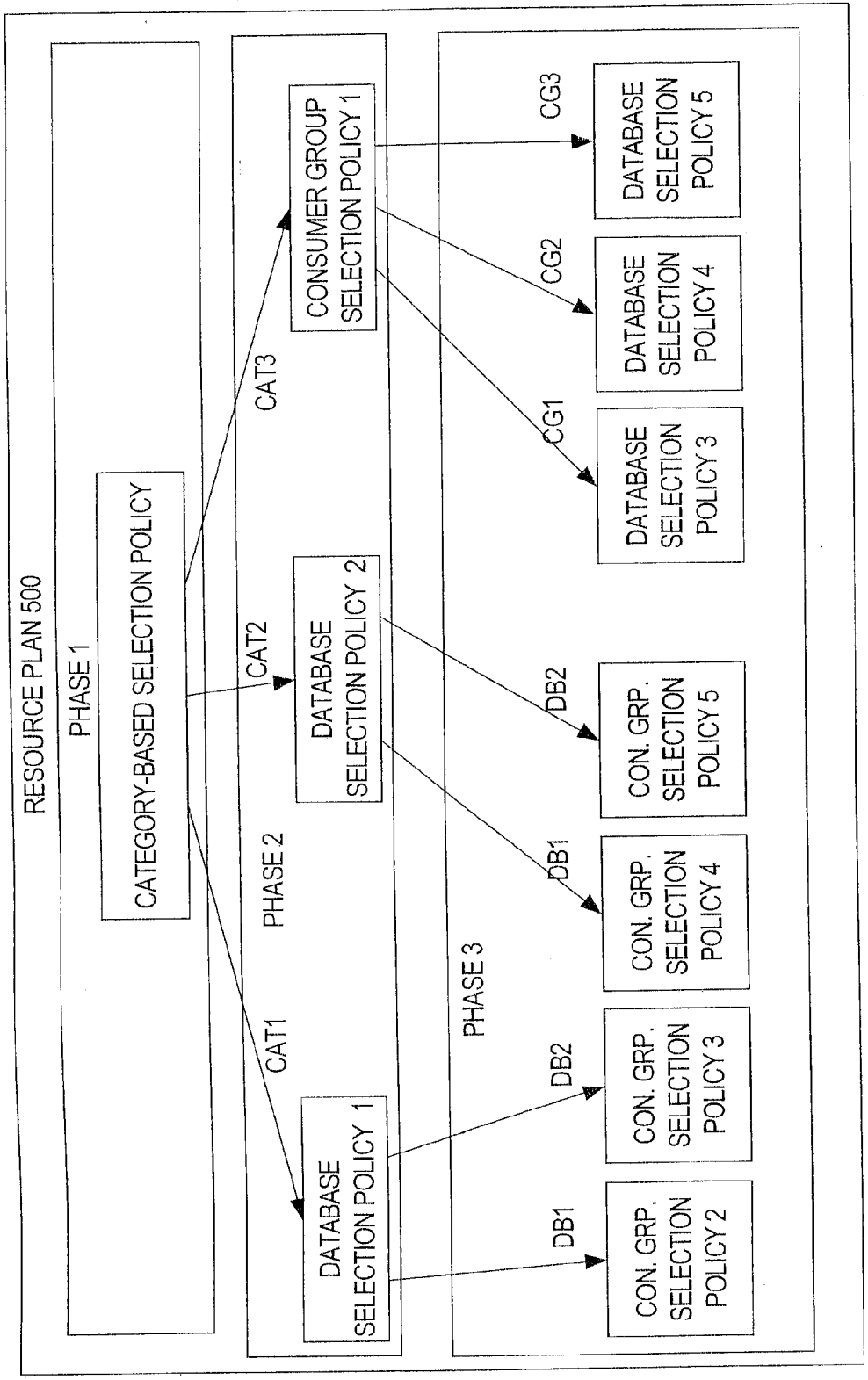
FIG. 5 is a block diagram illustrating two phases of per-survivor-group policies, according to an embodiment of the invention.

Referring to FIG. 5, phase 1 applies a category-based selection policy. The possible survivor groups produced by phase 1 include (a) I/O requests that belong to category 1, (b) I/O requests that belong to category 2, and (c) I/O requests that belong to category 1. In the case that phase 1 produces I/O requests that belong to category 1, the storage server will apply database selection policy 1 during phase 2. In the case that phase 1 produces I/O requests that belong to category 2, the storage server will apply database selection policy 2 during phase 2. In the case that phase 1 produces I/O requests that belong to category 3, the storage server will apply consumer group selection policy 1 during phase 2.

The possible survivor groups of database selection policy 1 include (a) category 1 I/O requests that target DB1, and (b) category 1 I/O requests that target DB2. In the case that category 1 I/O requests that target DB1 survive phase 2, the storage server will apply consumer group selection policy 2 during phase 3. In the case that category 1 I/O requests that target DB2 survive phase 2, the storage server will apply consumer group selection policy 3 during phase 3.

The possible survivor groups of database selection policy 2 include (a) category 2 I/O requests that target DB1, and (b) category 2 I/O requests that target DB2. In the case that category 2 I/O requests that target DB1 survive phase 2, the storage server will apply consumer group selection policy 4 during phase 3. In the case that category 2 I/O requests that target DB2 survive phase 2, the storage server will apply consumer group selection policy 5 during phase 3.

The possible survivor groups of consumer group selection policy 1 include (a) category 3 I/O requests that map to consumer group 1 (CG1), (b) category 3 I/O requests that map to consumer group 2 (CG2), and (c) category 3 I/O requests that map to category group 3 (CG3). In the case that category 3 I/O requests that map to CG1 survive phase 2, the storage server will apply database selection policy 3 during phase 3. In the case that category 3 I/O requests that map to CG2 survive phase 2, the storage server will apply database selection policy 4 during phase 3. In the case that category 3 I/O requests that map to CG3 survive phase 2, the storage server will apply database selection policy 5 during phase 3.

FIG. 5 is merely one example of how the policies that are applied at subsequent phases may differ based on which I/O requests survive the prior phases. The policy relationships established in a selection policy may be arbitrarily complex. For example, given a certain set of outcomes, the storage server may only apply three phases of policies, while other outcomes may require application of five phases of policies.

DATABASE-SPECIFIC CONSUMER GROUPS

As illustrated in FIG. 5, each database may have its own consumer-group-selection policy. Further, the consumer-group selection policy for one database may be based on an entirely different attribute-to-consumer group mapping than the logical-characteristic-value-to-consumer-group mappings employed by other databases. For example, in FIG. 5, consumer-group selection policy 2 may be the hybrid policy illustrated in Table 2, while consumer-group selection policy 3 is the ratio-based policy: CG1: 90%, CG2: 8%, CG3: 1%, CG4: 1%.

In this example, the consumer group selection policies differ both with respect to the number of consumer groups, and with respect to the structure of the policies. Different consumer group policies may also differ with respect to how the consumer groups are defined. For example, the attribute-to-consumer group mapping used to determine whether an I/O request belongs to Priority DSS, Maintenance, or DSS, may be completely different than the attribute-to-consumer group mapping used to determine whether an I/O request belongs to CG1, CG2, CG3, or CG4.

According to one embodiment, once consumer groups have been created, policies are created to specify how sessions are mapped to consumer groups. Sessions can be mapped to consumer groups based, for example, on session attributes. The session attributes may include, for example, a user name, the service that the session used to connect to the database, client machine, client program name, client user name, and so on. If a user is creating consumer groups for each application and each application has a dedicated service, then the user can create mapping policies based on service names. If a user wants to dedicate a consumer group to a particular set of users, then the user creates mapping policies based on their user names. As mentioned above, sessions that are not explicitly assigned to a consumer group may be placed in a default consumer group.

CREATING SELECTION POLICIES

As mentioned above, a selection policy may include policies that specify how I/O resources are allocated among consumer groups. In one embodiment, a selection policy contains a resource allocation directive for each consumer group, which consists of a percentage and a level. In one embodiment, a user may specify up to eight levels. Consumer groups at level 2 get resources that were not allocated at level 1 or were not consumed by a consumer group at level 1. Similarly, consumer groups at level 3 are allocated resources only when some allocation remains from levels 1 and 2. The same policies apply to levels 4 through 8. Multiple levels not only provide a way of prioritizing, but they provide a way of explicitly specifying how all primary and leftover resources are to be used. A user can construct selection policies that allocate resources across consumer groups using percentages, priorities, or a combination of the two.

ENABLING AND CHANGING SELECTION POLICIES

According to one embodiment, when a user sets a database selection policy on a database, a description of the selection policy is automatically sent to each storage system used to store data for the database. In some environments, multiple servers share access to the same database. In such an environment, all database servers in the cluster that share access to a particular database are set to the same selection policy. When a new storage system is added to the database, or an existing storage system is restarted, the current selection policy of the database is automatically sent to the storage system. The selection policy is used to manage resources on both the database server and cells.

According to one embodiment, selection policies can be changed dynamically. Various types of events may trigger the selection policy change. For example, a selection policy may change at based on the time of day, to allow different selection policies to be in effect during the night than are in effect during the day. As another example, a selection policy change may occur during weekends, or at a particular time of year, such as the end of the fiscal year.

WAITING QUEUES

As mentioned above, deferred I/O requests are placed in waiting queues within storage system 100. These waiting queues may be implemented in a variety of ways. In one embodiment, the deferred I/O requests are queued based on their "selection group", where each selection group has a separate queue. In this context, a selection group is a group of I/O requests that are treated the same by the policies that are in effect. For example, assume that the only policy in effect is the consumer group policy illustrated in Table 2. This policy establishes three consumer groups: Priority DSS, Maintenance, and DSS. If a selection policy includes only these policies, then the storage system would only have three waiting queues, one for each of the three consumer groups. All deferred I/O requests that have characteristic values that map to Priority DSS will be stored in the Priority DSS queue, regardless of other characteristics (such as the database they target). Similarly, all deferred I/O requests that map to the Maintenance and DSS consumer groups would be place into the waiting queues corresponding to those consumer groups, regardless of the other characteristic values they may have.

In more complex selection policies, there may be significantly more selection groups than consumer groups. For example, in selection policy 300 illustrated in FIG. 3, the category, target database and consumer groups all have an effect on how I/O requests are treated. Therefore, each (category, target database, consumer group) combination represents a distinct selection group that may have its own waiting queue. Specifically, (category 1, DB1, consumer group 1) would have one waiting queue, and (category 1, DB1, consumer group 2) would have another waiting queue. Because selection policy 300 establishes three categories, five databases and three consumer groups, the total number of selection groups (and therefore waiting queues) would be 3×5×3=45.

PHASE-BASE SELECTION OF A SELECTION GROUP

As mentioned above, when the storage server is selecting a deferred I/O request to process, the storage server applies the policies of the selection policy in phases. Each phase reduces the number of selection groups that survive. When only one selection group survives, the storage server selects the I/O request at the head of the waiting queue that corresponds to that selection group. For example, assume that a storage system implementing selection policy 300 becomes unsaturated and must select a deferred I/O request to process. Further assume that the only non-empty waiting queues correspond to selection groups: (category 2, DB1, consumer group 1), (category 2, DB2, consumer group 2), (category 2, DB2, consumer group 3), (category 3, DB2, consumer group 1), and (category 2, DB4, consumer group 3).

Under these circumstances, only those selection groups that are associated with category 2 would survive phase 1, because category 2 has higher priority than category 3, and there are no non-empty selection groups associated with category 1. Thus, after phase 1, the surviving selection groups would be: (category 2, DB1, consumer group 1), (category 2, DB2, consumer group 2), (category 2, DB2, consumer group 3), and (category 2, DB4, consumer group 3).

During phase 2, the storage server would determine which of DB1 or DB2 is furthest behind in achieving its I/O quota. DB4 is not considered, because the policies indicate that DB4 is only considered if no deferred I/Os target DB1, DB2 or DB3. Assuming that DB2 is the furthest behind in achieving its I/O quota, the selection groups that survive phase 2 would be: (category 2, DB2, consumer group 2), (category 2, DB2, consumer group 3).

During phase 3, the storage server would select consumer group 2, because the policy indicates that consumer group 3 is only considered if no pending I/O requests correspond to consumer groups 1 and 2. Consequently, after phase 3, the only remaining selection group is (category 2, DB2, consumer group 2). Therefore, the storage server would select the I/O request at the head of the waiting queue that corresponds to the selection group (category 2, DB2, consumer group 2).

In the example given above, all three phases had to be applied before a single non-empty selection group remained. However, depending on which selection groups are non-empty, it may be that fewer than all of the phases need to be applied. For example, consider the situation where the non-empty selection groups include: (category 1, DB5, consumer group 3), (category 2, DB1, consumer group 1), (category 2, DB2, consumer group 2), (category 2, DB2, consumer group 3), (category 3, DB2, consumer group 1), and (category 2, DB4, consumer group 3). In this situation, after phase 1 of selection policy 300 the only surviving selection group would be (category 1, DB5, consumer group 3), because this is the only non-empty selection group with pending I/O requests associated with category 1. Consequently, after phase 1, the storage server would simply select the I/O request at the head of the queue associated with (category 1, DB5, consumer group 3).

LOGICAL WAITING QUEUES

The queues into which the storage server places pending I/O requests need not be actual distinct data structures. Specifically, storage server may simply track (1) the logical characteristics of each pending I/O request, and (2) the time the I/O request was received by the storage system. Pending I/O requests that have the same logical characteristics belong to the same selection group, and are therefore treated as belonging to the same logical queue, even though no separate queue structure is used for the selection group.

In an embodiment that uses logical waiting queues rather than separate queue structures, the time the I/O requests were received may be used to indicate the order of each logical queue. Thus, for each selection group, the pending I/O request with the earliest arrival time being treated as residing at the head of the logical queue of the selection group. Alternatively, all pending I/O requests may be stored in a single waiting queue. For each selection group, the pending I/O request that is closest to the head of the single waiting queue is treated as being at the head of the logical waiting queue for the selection group.

EXAMPLE EMBODIMENTS

In an embodiment, a method comprises: while a storage system is in a saturated state, queuing, within the storage system, a plurality of I/O requests received by the storage system; and when the storage system is ready to process a pending I/O request that has been queued in the storage system, a storage server within the storage system selecting a particular I/O request to process based, at least in part, on one or more logical characteristics associated with particular I/O requests; and processing the particular I/O request in response to the storage server selecting the particular I/O request.

In an embodiment, a method further comprises: the storage system receiving one or more selection policies; and the storage server using policies indicated in each of the one or more selection policies to select which of the plurality of I/O requests to select for processing. In an embodiment, the storage server applies the policies in a plurality of phases. In an embodiment, the storage system stores data for a plurality of databases; and a particular phase that precedes all other phases of the plurality of phases includes policies for selecting between I/O requests based on the databases targeted by the I/O requests. In an embodiment, the storage system stores data for a plurality of databases; and a particular phase that follows at least one other phase of the plurality of phases includes policies for selecting between I/O requests based on the databases targeted by the I/O requests. In an embodiment, I/O requests that have similar logical characteristics belong to a selection group; the plurality of I/O requests correspond to a plurality of selection groups; and the policies applied by the storage server in a later phase of the plurality of phases are based, at least in part on which selection groups survive one or more earlier phases. In an embodiment, the policies include one or more ratio-based policies. In an embodiment, the policies further include one or more priority-based policies. In an embodiment, the policies include one or more hybrid policies. In an embodiment, at least one of the plurality of phases is associated with a hybrid policy.

In an embodiment, a plurality of consumer groups are specified in a logical-characteristic-value-to-consumer-group mapping; and the one or more logical characteristics include the consumer group to which the particular I/O request belongs. In an embodiment, the method further comprises: the storage system receiving the logical-characteristic-value-to-consumer-group mapping; and the storage server determining the consumer group to which the particular I/O request belongs based on request metadata of the particular I/O request and the logical-characteristic-value-to-consumer-group mapping. In an embodiment, the method further comprises: the storage system receiving request metadata for said particular I/O request; wherein the request metadata includes a consumer group identifier; and the storage server storage server selecting the particular I/O request based, at least in part, on the value of the consumer group identifier.

In an embodiment, the method further comprises: receiving at the storage server, from an I/O requestor that is submitting an I/O request, values for the one or more logical characteristics associated with the I/O request. In an embodiment, the method further comprises: receiving at the storage system, from a first I/O requestor that is submitting a first I/O request, first values for the one or more logical characteristics associated with the first I/O request; and receiving at the storage system, from a second I/O requestor that is submitting a second I/O request, second values for the one or more logical characteristics associated with the second I/O request; and wherein the storage server determines which of the first I/O request and the second I/O request to process first based, at least in part, on the first values and the second values. In an embodiment, the first I/O requestor is a first database server and the second I/O requestor is a second database server.

In an embodiment, the one or more logical characteristics include which database, of a plurality of databases stored within the storage system, is targeted by the I/O requests. In an embodiment, the one or more logical characteristics include which users are responsible for requesting the operations that produced the I/O requests. In an embodiment, the one or more logical characteristics include what type of workload is represented by the I/O requests.

In an embodiment, the method further comprises: the storage system determining an load setting based, at least in part, on information from the one or more selection policies; and the storage system determining when to process I/O requests based on the load setting. In an embodiment, the method further comprises: the storage system determining logical characteristics associated with I/O requests received by the storage system based on request metadata that accompanies the I/O requests; the storage system determining an load setting based, at least in part, on the logical characteristics associated with the I/O requests received by the storage system; and the storage system determining when to process I/O requests based on the load setting. In an embodiment, the steps of determining logical characteristics and determining an load setting are repeated periodically to dynamically vary the load based on how the storage system is being used.

In an embodiment, a method comprises: submitting to a storage system, by an I/O requestor, an I/O request; and submitting to the storage system, by the I/O requestor, values for one or more logical characteristics of the I/O request to enable a storage server within the storage system to prioritize I/O requests based on the one or more logical characteristics. In an embodiment, the I/O requestor is a database server, and the method further comprises the database server sending to the storage system a selection policy that indicates policies for the storage server to apply when selecting which I/O request to process. In an embodiment, the storage system stores data for a plurality of databases, and the policies include database-selection policies.

In an embodiment, a method comprises: a storage system automatically selecting a scheduling policy based on workloads that are associated with I/O requests that are received by the storage system; and the storage system determining when to issue pending I/O requests based on the scheduling policy. In an embodiment, the method further comprises: the storage system receiving metadata that indicates one or more logical characteristics of the I/O requests that are received by the storage system; and the storage system determining workloads that are associated with I/O requests based on the metadata. In an embodiment, the method further comprises: the storage system receiving one or more selection policies for selecting which pending I/O request to issue; and the storage system determining workloads that are associated with I/O requests based on the one or more selection policies. In an embodiment, the method further comprises: changing the scheduling policy from a first scheduling policy to a second scheduling policy in response to an event, wherein the first and second scheduling policies specify different target loads. In an embodiment, the event is a detected change in the relative frequency at which I/O requests are associated with particular workloads.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 6:
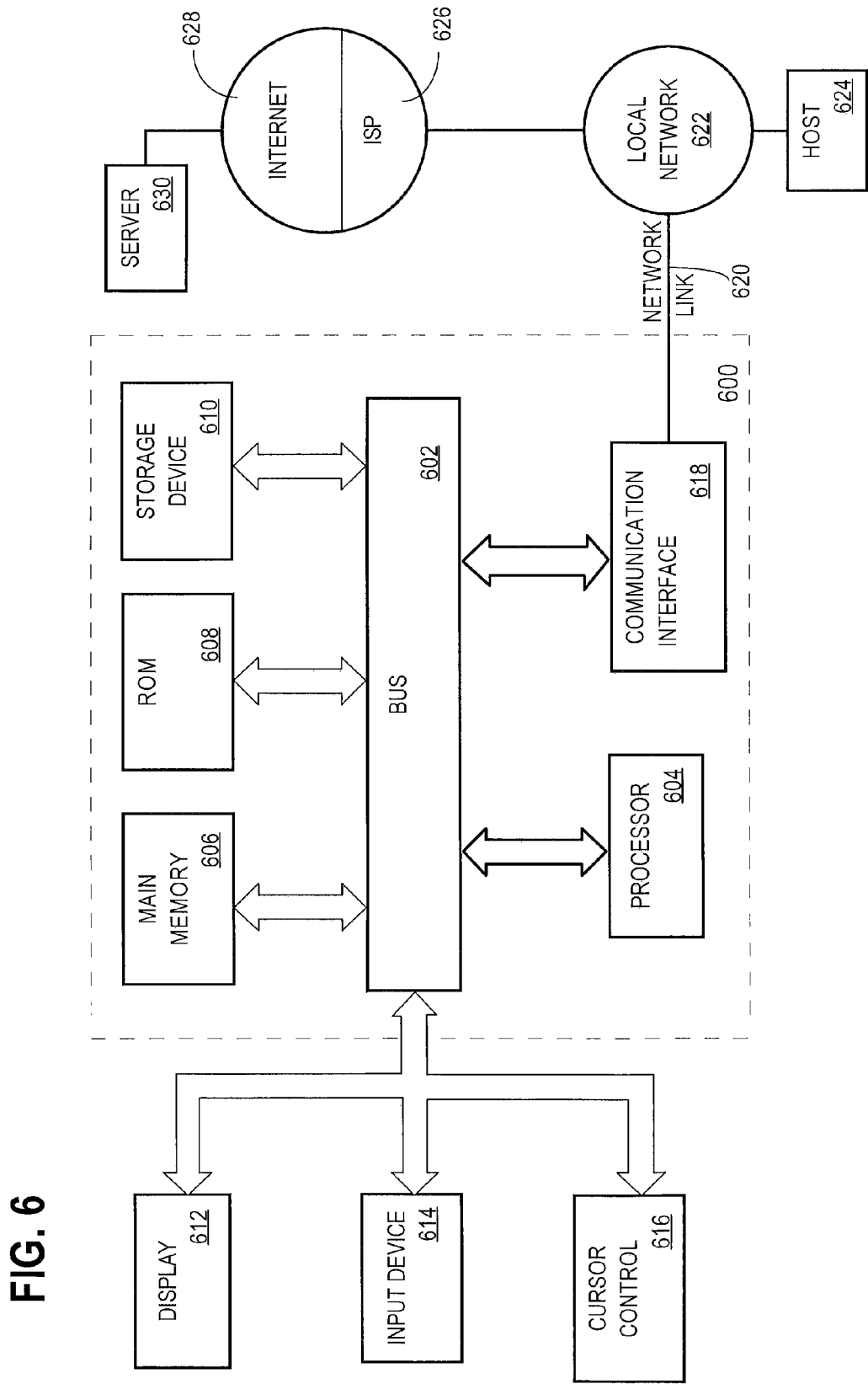
FIG. 6 is a block diagram of a computing device upon which embodiments of the invention may be implemented.

For example, FIG. 6 is a block diagram that illustrates a computer system 600 upon which an embodiment of the invention may be implemented. Computer system 600 includes a bus 602 or other communication mechanism for communicating information, and a hardware processor 604 coupled with bus 602 for processing information. Hardware processor 604 may be, for example, a general purpose microprocessor.

Computer system 600 also includes a main memory 606, such as a random access memory (RAM) or other dynamic storage device, coupled to bus 602 for storing information and instructions to be executed by processor 604. Main memory 606 also may be used for storing temporary variables or other intermediate information during execution of instructions to be executed by processor 604. Such instructions, when stored in storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube (CRT), for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

Computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor 604 executing one or more sequences of one or more instructions contained in main memory 606. Such instructions may be read into main memory 606 from another storage medium, such as storage device 610. Execution of the sequences of instructions contained in main memory 606 causes processor 604 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 610. Volatile media includes dynamic memory, such as main memory 606. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 602. Transmission media can also take the form of acoustic or light waves, such as those generated during radio-wave and infra-red data communications.

Various forms of media may be involved in carrying one or more sequences of one or more instructions to processor 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network (ISDN) card, cable modem, satellite modem, or a modem to provide a data communication connection to a corresponding type of telephone line. As another example, communication interface 618 may be a local area network (LAN) card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider (ISP) 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are example forms of transmission media.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618.

The received code may be executed by processor 604 as it is received, and/or stored in storage device 610, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    receiving, at a storage system, input/output (I/O) requests to read data from or write data to one or more storage devices, the I/O requests including physical characteristics that indicate locations within the one or more storage devices of the data to be read or written;
    queuing, within the storage system, a plurality of the I/O requests received by the storage system;
    when the storage system is ready to process a pending I/O request that has been queued in the storage system, a storage server within the storage system selecting, from the queued plurality of the I/O requests, a particular I/O request to process based, at least in part, on one or more logical characteristics associated with particular I/O requests in the plurality of the I/O requests;
    wherein the one or more logical characteristics are not the physical characteristics;
    wherein the one or more logical characteristics include, for at least a first I/O request of the particular I/O requests, an indication of at least one of:
        a database name associated with the first I/0 request, the database name specified by request metadata that accompanies the first I/O request;
        a workload type, the workload type categorizing work, performed by a first I/O requestor, for which the first I/O requestor issued the first I/O request; or
        a user name associated with a communication session responsive to which the first I/O requestor issued the first I/O request;
    processing the particular I/O request in response to the storage server selecting the particular I/O request by reading data from or writing data to a location indicated by particular physical characteristics included in the particular I/O request;
    wherein the method is performed by one or more computing devices.

2. The method of claim 1, further comprising receiving one or more selection policies from one or more database servers, the one or more selection policies indicating to the storage system how to select, from the queued plurality of the I/O requests, the particular I/O request to process.

3. The method of claim 2, further comprising:
    the storage system grouping the plurality of I/O requests into one or more groups based on the one or more logical characteristics associated with the particular I/O requests in the plurality of the I/O requests;
    the storage system applying the one or more selection policies to identify a particular group of the one or more groups from which to select the particular I/O request.

4. The method of claim 2, further comprising:
    receiving from the one or more database servers, with the one or more selection policies, policy-to-phase assignment data indicating how the one or more selection policies are to be applied over a plurality of phases, wherein the one or more selection policies include a plurality of policies;
    based at least on the policy-to-phase assignment data, identifying one or more first policies, of the one or more selection policies, to apply during one or more first phases of the plurality of phases;

during the one or more first phases, filtering the queued plurality of I/O requests by applying the identified one or more first policies, thereby yielding a filtered set of I/O requests;

based at least on the policy-to-phase assignment data, identifying a final policy, of the one or more selection policies, to apply during a final phase of the plurality of phases;

during a final phase of the plurality of phases, based on the policy-to-phase assignment data, selecting the particular I/O request from the filtered set of I/O requests by applying the final policy.

5. The method of claim 4, wherein identifying the one or more first policies or identifying the final policy is further based at least in part on which I/O requests remain unfiltered from the queued plurality of I/O requests after an immediately preceding phase.

6. The method of claim 4, wherein the policy-to-phase assignment data indicates that a first policy of the one or more first policies is based upon I/O requests that are grouped in part by database names, and that the final policy is based upon I/O requests that are grouped in part by workload type or consumer group.

7. The method of claim 2, further comprising:
receiving, at the storage system, an instruction from a database server to change the one or more selection policies.

8. The method of claim 7, wherein the instruction indicates a triggering event, in response to which the storage system is to change the one or more selection policies.

9. The method of claim 2, further comprising:
receiving from the one or more database servers, with the one or more selection policies, policy-to-disk assignment data indicating which selection policies are to be applied to which disks in the storage system.

10. The method of claim 2, further comprising:
receiving with the one or more selection policies data indicating a particular database, of the plurality of databases stored in the storage system, to which the one or more selection policies apply;

the storage system storing the one or more selection policies in association with the particular database;

the storage system selecting the particular I/O request to process in part by identifying a first group of I/O requests from which to select the particular I/O request, wherein identifying the first group comprises applying at least one of the one or more selection policies to a set of I/O requests that access the particular database.

11. The method of claim 10, further comprising receiving data indicating how to divide the set of I/O requests that access the particular database into a plurality of groups, including the first group, based on at least one logical characteristic, wherein the one or more selection policies indicate how to identify a group of the plurality of groups from which to select the particular I/O request.

12. The method of claim 1, further comprising:
the storage system dynamically adjusting a scheduling policy based upon the logical characteristics of the I/O requests, wherein the scheduling policy indicates when the storage system is ready to process pending I/O requests.

13. The method of claim 1, wherein the one or more logical characteristics include, for at least the first I/O request of the particular I/O requests, an indication of the workload type.

14. The method of Claim 13, further comprising:
receiving a mapping of workload types to groups;

grouping the plurality of I/O requests into a plurality of groups based on the mapping;

selecting the particular I/O request to process based on the particular I/O request belonging to a first group of the plurality of groups.

15. The method of claim 1, wherein the one or more logical characteristics include, for at least the first I/O request of the particular I/O requests, an indication of the user name.

16. The method of Claim 15, further comprising:
receiving a mapping of user names to groups;

grouping the plurality of I/O requests into a plurality of groups based on the mapping;

selecting the particular I/O request to process based on the particular I/O request belonging to a first group of the plurality of groups.

17. A method comprising:
receiving, at a storage system, from one or more database servers, input/output (I/O) requests to read data from or write data to one or more storage devices, the I/O requests indicating locations within the one or more storage devices of the data to be read or written;

wherein, for each of a plurality of databases within which the one or more database servers perform database operations, the one or more storage devices store at least some data;

wherein the I/O requests are accompanied by request metadata that at least specifies to which database of the plurality of databases that data involved in the I/O requests logically belong;

queuing, within the storage system, a plurality of the I/O requests;

when the storage system is ready to process a queued I/O request, a storage server within the storage system selecting which queued I/O request to process based on at least a first policy;

wherein the first policy distinguishes between I/O requests in part based on the databases to which the data involved in the I/O requests logically belong, as specified by the request metadata;

processing the queued I/O request that is selected based on the policy;

wherein the method is performed by one or more computing devices.

18. The method of claim 17, further comprising the storage system receiving an instruction to change the first policy from the one or more database servers.

19. The method of claim 17, wherein the first policy identifies at least a ratio of requests to process from a first set of one or more databases to requests to process from a second set of one or more databases.

20. The method of claim 17, further comprising:
storing the first policy in association with a particular database;

receiving data indicating how to divide a set of I/O requests that access the particular database into a plurality of groups based on at least one logical characteristic of the I/O requests, wherein the first policy indicates to the storage server how to identify a group of the plurality of groups from which to select a next I/O request to process.

21. A method of comprising:
receiving, at a storage system, from a database server, input/output (I/O) requests to read data from or write data to one or more storage devices;

queuing, within the storage system, a plurality of the I/O requests;

grouping the plurality of I/O requests into one or more groups based on one or more logical characteristics associated with particular I/O requests in the plurality of the I/O requests;
wherein grouping the plurality of I/O requests comprises grouping a first set of I/O requests in the plurality of I/O requests into a first group based on one or more logical characteristics specified by the database server when issuing the first set of I/O requests, the one or more logical characteristics including at least one of:
  a database name associated with the first set of I/O requests, the database name specified by request metadata that accompanies the first I/O request;
  a workload type, the workload type categorizing work, performed by the database server, for which the database server issued the first set of I/O requests;
  a consumer group, comprising a plurality of consumers, associated with the first set of I/O requests;
  a user name associated with a communication session responsive to which the database server issued the first set of I/O requests;
  a service through which the database server issued the first set of I/O requests; or
  a purpose for which the database server issued the first set of I/O requests;
receiving, at the storage system, one or more selection policies from the database server, the one or more selection policies specifying one or more ratios for the one or more groups;
when the storage system is ready to process a pending I/O request that has been queued in the storage system, a storage server within the storage system selecting, from the queued plurality of the I/O requests, a particular I/O request to process based, at least in part, on the one or more ratios and the group to which the particular I/O request belongs:,
processing the particular I/O request in response to the storage server selecting the particular I/O request;
wherein the method is performed by one or more computing devices.

22. A method comprising:
receiving, at a storage system, from a database server, input/output (I/O) requests to read data from or write data to one or more storage devices;
queuing, within the storage system, a plurality of the I/O requests;
grouping the plurality of I/O requests into one or more groups based on one or more logical characteristics associated with particular I/O requests in the plurality of the I/O requests;
receiving, at the storage system, one or more selection policies from the database server, the one or more selection policies specifying one or more ratios for the one or more groups;
receiving from the database server, with the one or more selection policies, policy-to-phase assignment data indicating how the one or more selection policies are to be applied over a plurality of phases, wherein the one or more selection policies include a plurality of policies;
when the storage system is ready to process a pending I/O request that has been queued in the storage system, a storage server within the storage system selecting, from the queued plurality of the I/O requests, a particular I/O request to process based, at least in part, on the one or more ratios and the group to which the particular I/O request belongs:,
wherein selecting the particular I/O request comprises:
  based at least on the policy-to-phase assignment data, identifying one or more first policies, of the one or more selection policies, to apply during one or more first phases of the plurality of phases;
  during the one or more first phases, filtering the queued plurality of I/O requests by applying the identified one or more first policies, thereby yielding a filtered set of I/O requests;
  based at least on the policy-to-phase assignment data, identifying a final policy, of the one or more selection policies, to apply during a final phase of the plurality of phases; and
  during the final phase of the plurality of phases, based on the policy-to-phase assignment data, selecting a particular I/O request from the filtered set of I/O requests by applying the final policy;
processing the particular I/O request in response to the storage server selecting the particular I/O request;
wherein the method is performed by one or more computing devices.

23. The method of claim 22, wherein the final policy involves a final ratio of the one or more ratios that is different than any ratio involved in the one or more first policies.

24. A method comprising:
receiving, at a storage system, from a database server, input/output (I/O) requests to read data from or write data to one or more storage devices;
queuing, within the storage system, a plurality of the I/O requests;
grouping the plurality of I/O requests into one or more groups based on one or more logical characteristics associated with particular I/O requests in the plurality of the I/O requests;
receiving, at the storage system, one or more selection policies from the database server, the one or more selection policies specifying one or more ratios for the one or more groups;
when the storage system is ready to process a pending I/O request that has been queued in the storage system, a storage server within the storage system selecting, from the queued plurality of the I/O requests, a particular I/O request to process based, at least in part, on the one or more ratios and the group to which the particular I/O request belongs:,
wherein selecting the particular I/O request comprises:
  based on the one or more ratios, identifying load usage allocations for a plurality of groups of I/O requests, the plurality of groups including the one or more groups;
  based on load statistics, identifying actual load usages for the plurality of groups over a period of time;
  identifying a particular group, of the one or more groups, whose actual load usage is further behind the load usage allocated to the particular group than any other group in the plurality of groups;
  selecting the particular I/O request from the particular group
processing the particular I/O request in response to the storage server selecting the particular I/O request;
wherein the method is performed by one or more computing devices.

25. One or more non-transitory computer-readable media storing instructions which, when executed by one or more computing devices, cause:
receiving, at a storage system, input/output (I/O) requests to read data from or write data to one or more storage devices, the I/O requests including physical characteristics that indicate locations within the one or more storage devices of the data to be read or written;

queuing, within the storage system, a plurality of the I/O requests received by the storage system;

when the storage system is ready to process a pending I/O request that has been queued in the storage system, a storage server within the storage system selecting, from the queued plurality of the I/O requests, a particular I/O request to process based, at least in part, on one or more logical characteristics associated with particular I/O requests in the plurality of the I/O requests;

wherein the one or more logical characteristics are not the physical characteristics;

wherein the one or more logical characteristics include, for at least a first I/O request of the particular I/O requests, an indication of at least one of:
- a database name associated with the first I/O request, the database name specified by request metadata that accompanies the first I/O request;
- a workload type, the workload type categorizing work, performed by a first I/O requestor, for which the first I/O requestor issued the first I/O request; or
- a user name associated with a communication session responsive to which the first I/O requestor issued the first I/O request;

processing the particular I/O request in response to the storage server selecting the particular I/O request by reading data from or writing data to a location indicated by particular physical characteristics included in the particular I/O request;

wherein the method is performed by one or more computing devices.

26. The one or more non-transitory computer-readable media of claim 25, wherein the instructions, when executed by the one or more computing devices, further cause:
receiving one or more selection policies from one or more database servers, the one or more selection policies indicating to the storage system how to select, from the queued plurality of the I/O requests, the particular I/O request to process.

27. The one or more non-transitory computer-readable media of claim 26, wherein the instructions, when executed by the one or more computing devices, further cause:
the storage system grouping the plurality of I/O requests into one or more groups based on the one or more logical characteristics associated with the particular I/O requests in the plurality of the I/O requests;
the storage system applying the one or more selection policies to identify a particular group of the one or more groups from which to select the particular I/O request.

28. The one or more non-transitory computer-readable media of claim 26, wherein the instructions, when executed by the one or more computing devices, further cause:
receiving from the one or more database servers, with the one or more selection policies, policy-to-phase assignment data indicating how the one or more selection policies are to be applied over a plurality of phases, wherein the one or more selection policies include a plurality of policies;
based at least on the policy-to-phase assignment data, identifying one or more first policies, of the one or more selection policies, to apply during one or more first phases of the plurality of phases;
during the one or more first phases, filtering the queued plurality of I/O requests by applying the identified one or more first policies, thereby yielding a filtered set of I/O requests;
based at least on the policy-to-phase assignment data, identifying a final policy, of the one or more selection policies, to apply during a final phase of the plurality of phases;
during a final phase of the plurality of phases, based on the policy-to-phase assignment data, selecting the particular I/O request from the filtered set of I/O requests by applying the final policy.

29. The one or more non-transitory computer-readable media of claim 28, wherein identifying the one or more first policies or identifying the final policy is further based at least in part on which I/O requests remain unfiltered from the queued plurality of I/O requests after an immediately preceding phase.

30. The one or more non-transitory computer-readable media of claim 28, wherein the policy-to-phase assignment data indicates that a first policy of the one or more first policies is based upon I/O requests that are grouped in part by database names, and that the final policy is based upon I/O requests that are grouped in part by workload type or consumer group.

31. The one or more non-transitory computer-readable media of claim 26, wherein the instructions, when executed by the one or more computing devices, further cause:
receiving, at the storage system, an instruction from a database server to change the one or more selection policies.

32. The one or more non-transitory computer-readable media of claim 31, wherein the instruction indicates a triggering event, in response to which the storage system is to change the one or more selection policies.

33. The one or more non-transitory computer-readable media of claim 26, wherein the instructions, when executed by the one or more computing devices, further cause:
receiving from the one or more database servers, with the one or more selection policies, policy-to-disk assignment data indicating which selection policies are to be applied to which disks in the storage system.

34. The one or more non-transitory computer-readable media of claim 26, wherein the instructions, when executed by the one or more computing devices, further cause:
receiving with the one or more selection policies data indicating a particular database, of the plurality of databases stored in the storage system, to which the one or more selection policies apply;
the storage system storing the one or more selection policies in association with the particular database;
the storage system selecting the particular I/O request to process in part by identifying a first group of I/O requests from which to select the particular I/O request, wherein identifying the first group comprises applying at least one of the one or more selection policies to a set of I/O requests that access the particular database.

35. The one or more non-transitory computer-readable media of claim 34, wherein the instructions, when executed by the one or more computing devices, further cause receiving data indicating how to divide the set of I/O requests that access the particular database into a plurality of groups, including the first group, based on at least one logical characteristic, wherein the one or more selection policies indicate how to identify a group of the plurality of groups from which to select the particular I/O request.

36. The one or more non-transitory computer-readable media of claim 25, wherein the instructions, when executed by the one or more computing devices, further cause:
the storage system dynamically adjusting a scheduling policy based upon the logical characteristics of the I/O requests, wherein the scheduling policy indicates when the storage system is ready to process pending I/O requests.

37. The one or more non-transitory computer-readable media of claim 25, wherein the one or more logical characteristics include, for at least the first I/O request of the particular I/O requests, an indication of the workload type.

38. The one or more non-transitory computer-readable media of claim 37, wherein the instructions, when executed by the one or more computing devices, further cause:
receiving a mapping of workload types to groups;
grouping the plurality of I/O requests into a plurality of groups based on the mapping;
selecting the particular I/O request to process based on the particular I/O request belonging to a first group of the plurality of groups.

39. The one or more non-transitory computer-readable media of claim 25, wherein the one or more logical characteristics include, for at least the first I/O request of the particular I/O requests, an indication of the user name.

40. The one or more non-transitory computer-readable media of claim 39, wherein the instructions, when executed by the one or more computing devices, further cause:
receiving a mapping of user names to groups;
grouping the plurality of I/O requests into a plurality of groups based on the mapping;
selecting the particular I/O request to process based on the particular I/O request belonging to a first group of the plurality of groups.

41. One or more non-transitory computer-readable media storing instructions which, when executed by one or more computing devices, cause:
receiving, at the storage system, from one or more database servers, input/output (I/O) requests to read data from or write data to one or more storage devices, the I/O requests indicating locations within the one or more storage devices of the data to be read or written;
wherein, for each of a plurality of databases within which the one or more database servers perform database operations, the one or more storage devices store at least some data;
wherein the I/O requests are accompanied by request metadata that at least specifies to which databases of the plurality of databases the data involved in the I/O requests logically belong;
queuing, within the storage system, a plurality of the I/O requests;
when the storage system is ready to process a queued I/O request, a storage server within the storage system selecting which queued I/O request to process based on at least a first policy;
wherein the first policy distinguishes between I/O requests in part based on the databases to which the data involved in the I/O requests logically belong, as specified by the request metadata;
processing the queued I/O request that is selected based on the policy;
wherein the method is performed by one or more computing devices.

42. The one or more non-transitory computer-readable media of claim 41, wherein the instructions, when executed by the one or more computing devices, further cause the storage system receiving an instruction to change the first policy from the one or more database servers.

43. The one or more non-transitory computer-readable media of claim 41, wherein the first policy identifies at least a ratio of requests to process from a first set of one or more databases to requests to process from a second set of one or more databases.

44. The one or more non-transitory computer-readable media of claim 41, wherein the instructions, when executed by the one or more computing devices, further cause:
storing the first policy in association with a particular database;
receiving data indicating how to divide a set of I/O requests that access the particular database into a plurality of groups based on at least one logical characteristic of the I/O requests, wherein the first policy indicates to the storage server how to identify a group of the plurality of groups from which to select a next I/O request to process.

45. One or more non-transitory computer-readable media storing instructions which, when executed by one or more computing devices, cause:
receiving, at a storage system, from a database server, input/output (I/O) requests to read data from or write data to one or more storage devices;
queuing, within the storage system, a plurality of the I/O requests;
grouping the plurality of I/O requests into one or more groups based on one or more logical characteristics associated with particular I/O requests in the plurality of the I/O requests;
wherein grouping the plurality of I/O requests comprises grouping a first set of I/O requests in the plurality of I/O requests into a first group based on one or more logical characteristics specified by the database server when issuing the first set of I/O requests, the one or more logical characteristics including at least one of:
a database name associated with the first set of I/O requests, the database name specified by request metadata that accompanies the first I/O request;
a workload type, the workload type categorizing work, performed by the database server, for which the database server issued the first set of I/O requests;
a consumer group, comprising a plurality of consumers, associated with the first set of I/O requests;
a user name associated with a communication session responsive to which the database server issued the first set of I/O requests;
a service through which the database server issued the first set of I/O requests; or
a purpose for which the database server issued the first set of I/O requests
receiving, at the storage system, one or more selection policies from the database server, the one or more selection policies specifying one or more ratios for the one or more groups;
when the storage system is ready to process a pending I/O request that has been queued in the storage system, a storage server within the storage system selecting, from the queued plurality of the I/O requests, a particular I/O request to process based, at least in part, on the one or more ratios and the group to which the particular I/O request belongs:,
processing the particular I/O request in response to the storage server selecting the particular I/O request.

46. One or more non-transitory computer-readable media storing instructions which, when executed by one or more computing devices, cause:
receiving, at a storage system, from a database server, input/output (I/O) requests to read data from or write data to one or more storage devices;

queuing, within the storage system, a plurality of the I/O requests;

grouping the plurality of I/O requests into one or more groups based on one or more logical characteristics associated with particular I/O requests in the plurality of the I/O requests;

receiving, at the storage system, one or more selection policies from the database server, the one or more selection policies specifying one or more ratios for the one or more groups;

receiving from the database server, with the one or more selection policies, policy-to-phase assignment data indicating how the one or more selection policies are to be applied over a plurality of phases, wherein the one or more selection policies include a plurality of policies;

when the storage system is ready to process a pending I/O request that has been queued in the storage system, a storage server within the storage system selecting, from the queued plurality of the I/O requests, a particular I/O request to process based, at least in part, on the one or more ratios and the group to which the particular I/O request belongs:, wherein selecting the particular I/O request comprises:
 based at least on the policy-to-phase assignment data, identifying one or more first policies, of the one or more selection policies, to apply during one or more first phases of the plurality of phases;
 during the one or more first phases, filtering the queued plurality of I/O requests by applying the identified one or more first policies, thereby yielding a filtered set of I/O requests;
 based at least on the policy-to-phase assignment data, identifying a final policy, of the one or more selection policies, to apply during a final phase of the plurality of phases; and
 during the final phase of the plurality of phases, based on the policy-to-phase assignment data, selecting a particular I/O request from the filtered set of I/O requests by applying the final policy;

processing the particular I/O request in response to the storage server selecting the particular I/O request.

47. The one or more non-transitory computer-readable media of claim 46, wherein the final policy involves a final ratio of the one or more ratios that is different than any ratio involved in the one or more first policies.

48. One or more non-transitory computer-readable media storing instructions which, when executed by one or more computing devices, cause:
 receiving, at a storage system, from a database server, input/output (I/O) requests to read data from or write data to one or more storage devices;
 queuing, within the storage system, a plurality of the I/O requests;
 grouping the plurality of I/O requests into one or more groups based on one or more logical characteristics associated with particular I/O requests in the plurality of the I/O requests;

receiving, at the storage system, one or more selection policies from the database server, the one or more selection policies specifying one or more ratios for the one or more groups;
 when the storage system is ready to process a pending I/O request that has been queued in the storage system, a storage server within the storage system selecting, from the queued plurality of the I/O requests, a particular I/O request to process based, at least in part, on the one or more ratios and the group to which the particular I/O request belongs:,
 wherein selecting the particular I/O request comprises:
  based on the one or more ratios, identifying load usage allocations for a plurality of groups of I/O requests, the plurality of groups including the one or more groups;
  based on load statistics, identifying actual load usages for the plurality of groups over a period of time;
  identifying a particular group, of the one or more groups, whose actual load usage is further behind the load usage allocated to the particular group than any other group in the plurality of groups;
  selecting the particular I/O request from the particular group:
 processing the particular I/O request in response to the storage server selecting the particular I/O request.

49. The method of claim 17, further comprising:
 receiving, at the one or more database servers, one or more database commands to manipulate or search for data objects in the plurality of databases;
 at the database server, translating the one or more database commands into the I/O requests;
 responsive to the I/O requests, receiving, at the database server, blocks of data from the storage system;
 translating, at the database server, the blocks of data received from the storage system into the data objects, from the plurality of databases, referenced by the database commands;
 executing, at the database server, the one or more database commands based on the data objects translated from the blocks of data received from the storage system.

50. The one or more non-transitory computer-readable media of claim 41, wherein the instructions, when executed by the one or more computing devices, further cause:
 receiving, at the one or more database servers, one or more database commands to manipulate or search for data objects in the plurality of databases;
 at the database server, translating the one or more database commands into the I/O requests;
 responsive to the I/O requests, receiving, at the database server, blocks of data from the storage system;
 translating, at the database server, the blocks of data received from the storage system into the data objects, from the plurality of databases, referenced by the database commands;
 executing, at the database server, the one or more database commands based on the data objects translated from the blocks of data received from the storage system.

* * * * *

UNITED STATES PATENT AND TRADEMARK OFFICE
CERTIFICATE OF CORRECTION

PATENT NO. : 8,521,923 B2
APPLICATION NO. : 13/418150
DATED : August 27, 2013
INVENTOR(S) : Lee et al.

It is certified that error appears in the above-identified patent and that said Letters Patent is hereby corrected as shown below:

In the Specification

In column 4, line 4, delete "sales" and insert -- sales. --, therefor.

In column 4, line 6, delete "databases" and insert -- databases. --, therefor.

In column 4, line 8, delete "workloads" and insert -- workloads. --, therefor.

In column 6, line 11, delete "that that" and insert -- that --, therefor.

In column 10, line 4, delete "sales" and insert -- sales. --, therefor.

In column 10, line 6, delete "databases" and insert -- databases. --, therefor.

In the Claims

In column 22, line 28, in Claim 1, delete "I/0" and insert -- I/O --, therefor.

In column 24, line 28, in Claim 17, delete "database" and insert -- databases --, therefor.

In column 24, line 29, in Claim 17, delete "that" and insert -- the --, therefor.

In column 24, line 62, in Claim 21, after "method" delete "of".

In column 25, line 36, in Claim 21, delete "belongs:," and insert -- belongs; --, therefor.

In column 25, line 66, in Claim 22, delete "belongs:," and insert -- belongs; --, therefor.

In column 26, line 44, in Claim 24, delete "belongs:," and insert -- belongs; --, therefor.

In column 26, line 57, in Claim 24, delete "group" and insert -- group; --, therefor.

Signed and Sealed this
Thirty-first Day of December, 2013

Margaret A. Focarino
*Commissioner for Patents of the United States Patent and Trademark Office*

In column 30, line 48, in Claim 45, delete "requests" and insert -- requests; --, therefor.

In column 30, line 59, in Claim 45, delete "belongs:," and insert -- belongs; --, therefor.

In column 31, line 23, in Claim 46, delete "belongs:," and insert -- belongs; --, therefor.

In column 32, line 11, in Claim 48, delete "belongs:," and insert -- belongs; --, therefor.

In column 32, line 23, in Claim 48, delete "group:" and insert -- group; --, therefor.